United States Patent
Abotabl et al.

(10) Patent No.: US 12,484,069 B2
(45) Date of Patent: Nov. 25, 2025

(54) PHYSICAL DOWNLINK CONTROL CHANNEL LINKAGE ACROSS DIFFERENT SLOTS

(71) Applicant: QUALCOMM Incorporated, San Diego, CA (US)

(72) Inventors: Ahmed Attia Abotabl, San Diego, CA (US); Marwen Zorgui, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 466 days.

(21) Appl. No.: 18/053,571

(22) Filed: Nov. 8, 2022

(65) Prior Publication Data

US 2024/0155623 A1    May 9, 2024

(51) Int. Cl.
*H04W 72/23*    (2023.01)
*H04W 72/0446*    (2023.01)
*H04W 76/20*    (2018.01)
*H04W 92/10*    (2009.01)

(52) U.S. Cl.
CPC ....... *H04W 72/23* (2023.01); *H04W 72/0446* (2013.01); *H04W 76/20* (2018.02); *H04W 92/10* (2013.01)

(58) Field of Classification Search
None
See application file for complete search history.

(56) References Cited

U.S. PATENT DOCUMENTS

| | | | | |
|---|---|---|---|---|
| 12,232,135 B2 * | 2/2025 | Huang | ............... | H04L 5/0053 |
| 2021/0028883 A1 * | 1/2021 | Wang | ............... | H04W 72/23 |
| 2021/0160111 A1 * | 5/2021 | Ma | ............... | H04L 5/0044 |
| 2022/0225319 A1 * | 7/2022 | Khoshnevisan | .. | H04W 72/0453 |
| 2022/0232406 A1 * | 7/2022 | Khoshnevisan | ...... | H04W 24/08 |
| 2022/0239418 A1 * | 7/2022 | Jang | ............... | H04L 1/08 |
| 2022/0264339 A1 * | 8/2022 | Kim | ............... | H04L 1/00 |
| 2022/0287076 A1 * | 9/2022 | Khoshnevisan | ...... | H04L 1/1887 |
| 2022/0408468 A1 * | 12/2022 | Jang | ............... | H04L 5/0094 |
| 2023/0016937 A1 * | 1/2023 | Jang | ............... | H04B 7/0695 |
| 2023/0117189 A1 * | 4/2023 | Kim | ............... | H04L 1/0038 370/329 |
| 2023/0292316 A1 * | 9/2023 | Cheng | ............... | H04W 72/1273 |
| 2023/0354327 A1 * | 11/2023 | El Hamss | ............... | H04L 5/0053 |
| 2023/0403720 A1 * | 12/2023 | Song | ............... | H04W 72/232 |
| 2024/0064760 A1 * | 2/2024 | Sun | ............... | H04L 5/0023 |
| 2024/0089061 A1 * | 3/2024 | Gao | ............... | H04L 5/0098 |
| 2024/0147492 A1 * | 5/2024 | Gao | ............... | H04L 1/08 |

* cited by examiner

*Primary Examiner* — Lonnie V Sweet
(74) *Attorney, Agent, or Firm* — Harrity & Harrity, LLP

(57) ABSTRACT

Various aspects of the present disclosure generally relate to wireless communication. In some aspects, a user equipment (UE) may receive a physical downlink control channel (PDCCH) linkage indication that is based at least in part on a slot configuration. The UE may receive a first PDCCH in a first PDCCH occasion and a second PDCCH that is a repetition of the first PDCCH in a second PDCCH occasion, the second PDCCH occasion comprising an occurrence of one or more air interface resources configured with the slot configuration. Numerous other aspects are described.

30 Claims, 11 Drawing Sheets

PHYSICAL DOWNLINK CONTROL CHANNEL LINKAGE ACROSS DIFFERENT SLOTS

FIELD OF THE DISCLOSURE

Aspects of the present disclosure generally relate to wireless communication and to techniques and apparatuses for physical downlink control channel (PDCCH) linkage across different slots.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors coupled to the memory. The one or more processors may be configured to receive a physical downlink control channel (PDCCH) linkage indication that is based at least in part on a slot configuration. The one or more processors may be configured to receive a first PDCCH in a first PDCCH occasion and a second PDCCH that is a repetition of the first PDCCH in a second PDCCH occasion, the second PDCCH occasion comprising an occurrence of one or more air interface resources configured with the slot configuration.

Some aspects described herein relate to an apparatus for wireless communication at a network node. The apparatus may include a memory and one or more processors coupled to the memory. The one or more processors may be configured to transmit a PDCCH linkage indication that is based at least in part on a slot configuration. The one or more processors may be configured to transmit at least one of, a first PDCCH in a first PDCCH occasion, or a second PDCCH that is a repetition of the first PDCCH in a second PDCCH occasion that comprises an occurrence of one or more air interface resources configured with the slot configuration.

Some aspects described herein relate to a method of wireless communication performed by an apparatus of a UE. The method may include receiving a PDCCH linkage indication that is based at least in part on a slot configuration. The method may include receiving a first PDCCH in a first PDCCH occasion and a second PDCCH that is a repetition of the first PDCCH in a second PDCCH occasion, the second PDCCH occasion comprising an occurrence of one or more air interface resources configured with the slot configuration.

Some aspects described herein relate to a method of wireless communication performed by an apparatus of a network node. The method may include transmitting a PDCCH linkage indication that is based at least in part on a slot configuration. The method may include transmitting at least one of, a first PDCCH in a first PDCCH occasion, or a second PDCCH that is a repetition of the first PDCCH in a second PDCCH occasion that comprises an occurrence of one or more air interface resources configured with the slot configuration.

Some aspects described herein relate to a non-transitory computer-readable medium that stores a set of instructions for wireless communication by a UE. The set of instructions, when executed by one or more processors of the UE, may cause the UE to receive a PDCCH linkage indication that is based at least in part on a slot configuration. The set of instructions, when executed by one or more processors of the UE, may cause the UE to receive a first PDCCH in a first PDCCH occasion and a second PDCCH that is a repetition of the first PDCCH in a second PDCCH occasion, the second PDCCH occasion comprising an occurrence of one or more air interface resources configured with the slot configuration.

Some aspects described herein relate to a non-transitory computer-readable medium that stores a set of instructions for wireless communication by a network node. The set of instructions, when executed by one or more processors of the network node, may cause the network node to transmit a PDCCH linkage indication that is based at least in part on a slot configuration. The set of instructions, when executed by one or more processors of the network node, may cause the network node to transmit at least one of, a first PDCCH in a first PDCCH occasion, or a second PDCCH that is a repetition of the first PDCCH in a second PDCCH occasion that comprises an occurrence of one or more air interface resources configured with the slot configuration.

Some aspects described herein relate to an apparatus for wireless communication. The apparatus may include means for receiving a PDCCH linkage indication that is based at least in part on a slot configuration. The apparatus may include means for receiving a first PDCCH in a first PDCCH occasion and a second PDCCH that is a repetition of the first PDCCH in a second PDCCH occasion, the second PDCCH occasion comprising an occurrence of one or more air interface resources configured with the slot configuration.

Some aspects described herein relate to an apparatus for wireless communication. The apparatus may include means for transmitting a PDCCH linkage indication that is based at least in part on a slot configuration. The apparatus may include means for transmitting at least one of, a first PDCCH in a first PDCCH occasion, or a second PDCCH that is a repetition of the first PDCCH in a second PDCCH occasion that comprises an occurrence of one or more air interface resources configured with the slot configuration.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
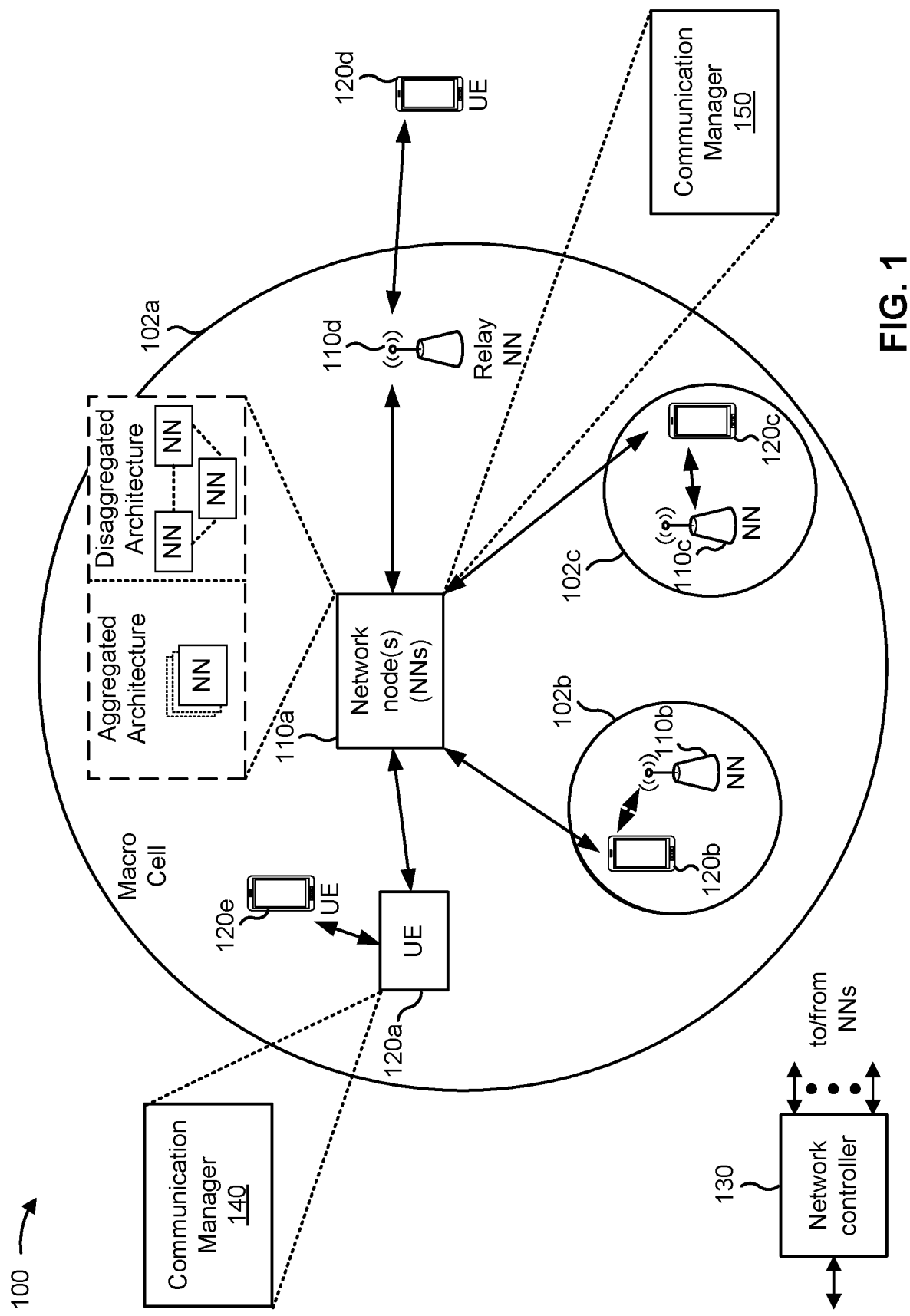
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may receive a physical downlink control channel (PDCCH) linkage indication that is based at least in part on a slot configuration; and receive a first PDCCH in a first PDCCH occasion and a second PDCCH that is a repetition of the first PDCCH in a second PDCCH occasion, the second PDCCH occasion comprising an occurrence of one or more air interface resources configured with the slot configuration. Additionally, or alternatively, the communication manager 140 may perform one or more other operations described herein.

In some aspects, a network node (e.g., the network node 110) may include a communication manager 150. As described in more detail elsewhere herein, the communication manager 150 may transmit a PDCCH linkage indication that is based at least in part on a slot configuration; and transmit at least one of: a first PDCCH in a first PDCCH occasion, or a second PDCCH that is a repetition of the first PDCCH in a second PDCCH occasion that comprises an occurrence of one or more air interface resources configured with the slot configuration. Additionally, or alternatively, the communication manager 150 may perform one or more other operations described herein.

As indicated above, FIG. 1 is provided as an example. Other examples may differ from what is described with regard to FIG. 1.

Figure 2:
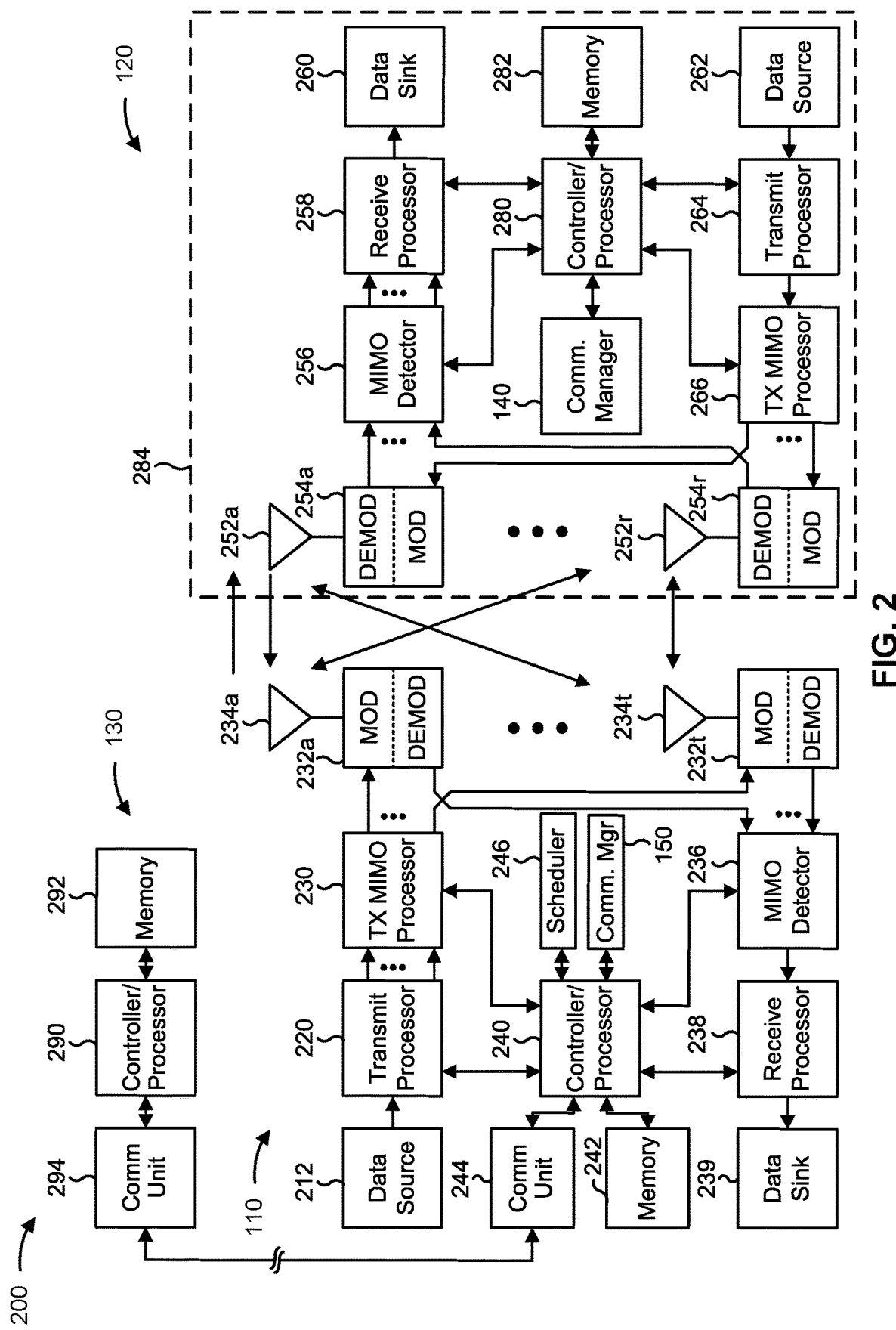
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the network node 110, the controller/processor 280 of the UE 120, and/or any other component(s) of FIG. 2 may perform one or more techniques associated with for PDCCH linkage across different slots, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving a PDCCH linkage indication that is based at least in part on a slot configuration; and/or means for receiving a first PDCCH in a first PDCCH occasion and a second PDCCH that is a repetition of the first PDCCH in a second PDCCH occasion, the second PDCCH occasion comprising an occurrence of one or more air interface resources configured with the slot configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting a PDCCH linkage indication that is based at least in part on a slot configuration; and/or means for transmitting at least one of: a first PDCCH in a first PDCCH occasion, or a second PDCCH that is a repetition of the first PDCCH in a second PDCCH occasion that comprises an occurrence of one or more air interface resources configured with the slot configuration. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
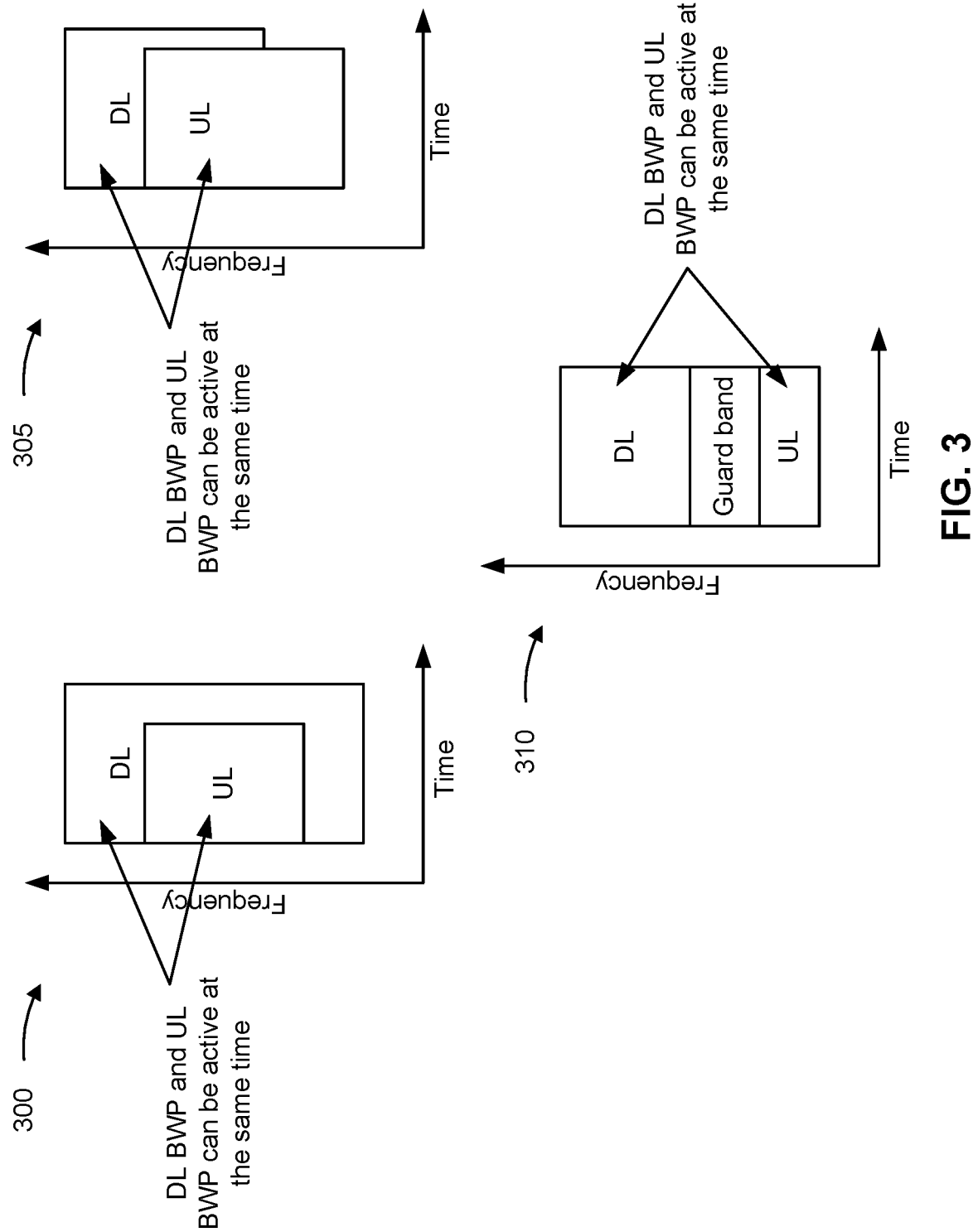
FIG. 3 is a diagram illustrating a first example, a second example, and a third example of full-duplex communication in a wireless network, in accordance with the present disclosure.

FIG. 3 is a diagram illustrating a first example 300, a second example 305, and a third example 310 of full-duplex communication in a wireless network, in accordance with the present disclosure. "Full-duplex communication" in a wireless network refers to simultaneous bi-directional communication between devices in the wireless network. For example, a UE operating in a full-duplex mode may transmit an uplink (UL) communication and receive a downlink (DL) communication at the same time (e.g., in the same slot or the same symbol). "Half-duplex communication" in a wireless network refers to unidirectional communications (e.g., only downlink communication or only uplink communication) between devices at a given time (e.g., in a given slot or a given symbol).

As shown in FIG. 3, the first example 300 and the second example 305 show examples of in-band full-duplex (IBFD) communication. In IBFD, a UE may transmit an uplink communication to a network node and receive a downlink communication from the network node on the same time and frequency resources. As shown in the first example 300 of IBFD, the time and frequency resources for uplink communication may fully overlap with the time and frequency resources for downlink communication. As shown in the second example 305 of IBFD, the time and frequency resources for uplink communication may partially overlap with the time and frequency resources for downlink communication.

As further shown in FIG. 3, the third example 310 shows an example of sub-band full-duplex (SBFD) communication, which may also be referred to as "sub-band frequency division duplex (SBFDD)" or "flexible duplex." In SBFD, a UE may transmit an uplink communication to a network node and receive a downlink communication from the network node at the same time, but on different frequency resources. For example, the different frequency resources may be sub-bands of a frequency band, such as a time division duplexing band. In this case, the frequency resources used for downlink communication may be separated from the frequency resources used for uplink communication, in the frequency domain, by a guard band.

As indicated above, FIG. 3 is provided as an example. Other examples may differ from what is described with respect to FIG. 3.

Figure 4:
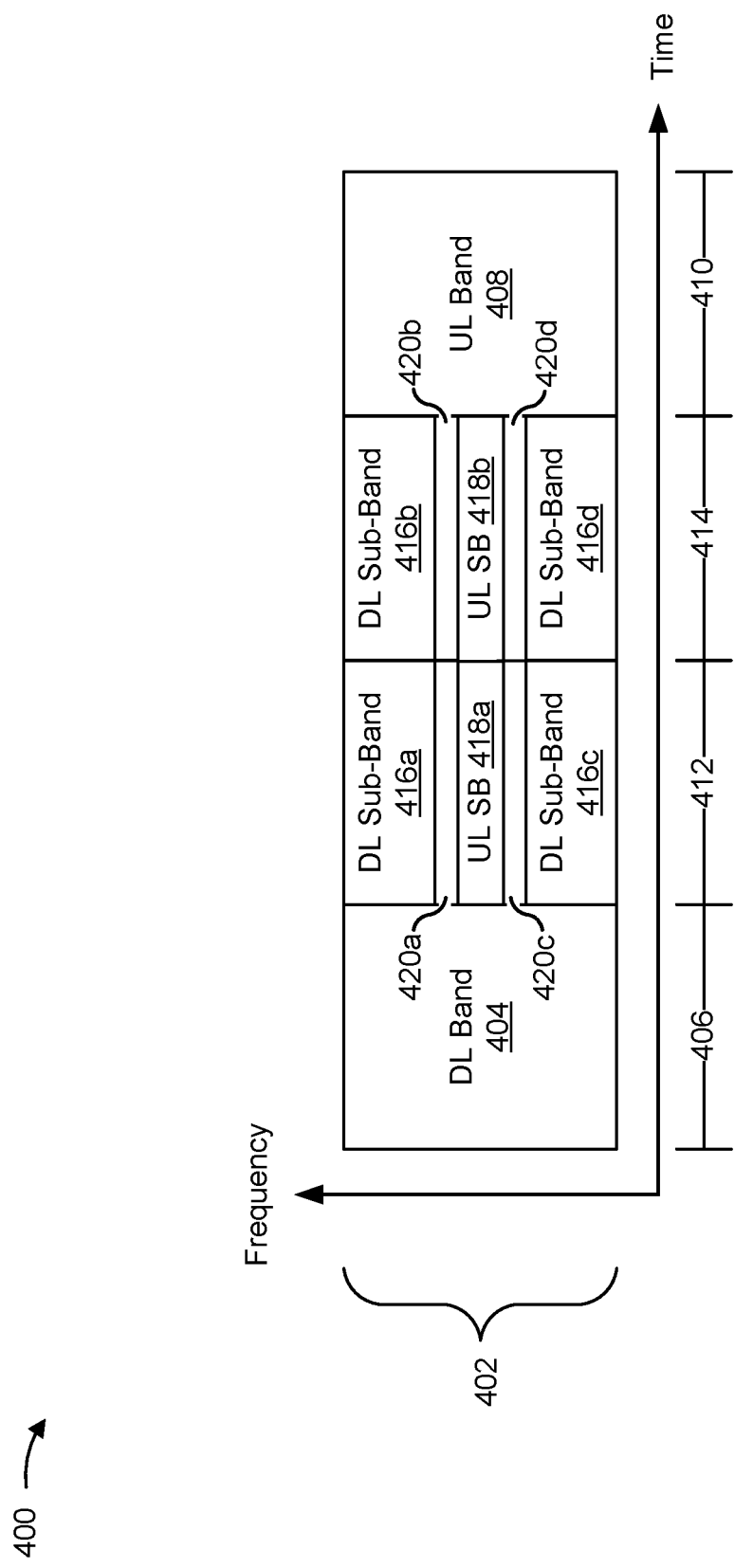
FIG. 4 is a diagram illustrating an example of a sub-band full-duplex (SBFD) format, in accordance with the present disclosure.

FIG. 4 is a diagram illustrating an example 400 of an SBFD format 402, in accordance with the present disclosure. As shown by the example 400, the SBFD format 402 may specify a slot format pattern that is based at least in part on one or more time partitions (shown on a horizontal axis) in combination with one or more frequency partitions (shown on a vertical axis). To illustrate, each time partition may correspond to a time slot (e.g., "slot"), a portion of a time slot, and/or a portion of a transmission time interval (TTI). Each frequency partition may correspond to a full frequency band and/or a frequency sub-band. The slot format pattern may include any combination of one or more full band slots, one or more sub-band slots, and/or one or more guard bands. In some aspects, a network node (e.g., the network node 110) and a UE (e.g., the UE 120) may communicate with one another based at least in part on the SBFD format 402 to transmit and/or receive wireless signals.

As one example, and as shown by the SBFD format 402, an SBFD format may include a full downlink band 404 (DL band 404) positioned at a start of the slot format pattern at time duration 406 (e.g., a first slot) and a full uplink band 408 (UL band 408) positioned at an end of the slot format pattern at time duration 410 (a second slot). Other examples may position a full DL band and/or a full UL band at different time durations. At time duration 412 (e.g., a third slot) and time duration 414 (e.g., a fourth slot), the SBFD format 402 may partition the full band into one or more partial and/or sub-bands (e.g., a sub-band of a full frequency band associated with the SBFD format). The SBFD format 402 may partition the sub-bands into a same size or in varying sizes. A size of a sub-band may be based at least in part on a resource block (RB). As one example, a first sub-band may have a size of two RBs, a second sub-band may have a size of four RBs, and/or a third sub-band may have a size of eight RBs. Some aspects may limit a number of sub-bands that may be included in a bandwidth and/or a bandwidth part. As one example, a communication standard may limit a number of sub-bands to N to reduce an amount of total communication associated with reporting measurements for each sub-band, where N is an integer.

As shown by the example 400, the SBFD format 402 may specify one or more sub-bands of a same or different size to one or more downlink communications. To illustrate, the SBFD format 402 designates downlink sub-band 416a (DL sub-band 416a), downlink sub-band 416b (DL sub-band 416b), downlink sub-band 416c (DL sub-band 416c), and downlink sub-band 416d (DL sub-band 416d) to downlink communication(s). An SBFD format may also designate one or more sub-bands to one or more uplink communications, shown by the SBFD format 402 as uplink sub-band 418a (UL sub-band 418a) and uplink sub-band 418b (UL sub-band 418b). Alternatively or additionally, an SBFD format may specify one or more guard bands between a DL sub-band and a UL sub-band, such as guard band 420a, guard band 420b, guard band 420c, and/or guard band 420d as shown by the SBFD format 402.

In some aspects, the SBFD format 402 may repeat over time. For example, at the expiration of the time duration 410, the SBFD format 402 may repeat as shown by the time duration 406 (e.g., the DL band 404), the time duration 412 (e.g., the DL sub-band 416a, the DL sub-band 416c, the UL sub-band 418a, the guard band 420a, and the guard band 420c), the time duration 414 (e.g., the DL sub-band 416b, the DL sub-band 416d, the UL sub-band 418b, the guard band 420b, and the guard band 420d), and the time duration 410 (e.g., the UL band 408). Repeating the SBFD format 402 may denote that a network node (e.g., the network node 110) and a UE (e.g., the UE 120) may repeat communicating with one another based at least in part on the (repeated) SBFD format 402.

The slot format pattern shown by the SBFD format 402 may vary in other examples. As one example, the full band shown at the time duration 406 (e.g., the DL band 404) and/or at the time duration 410 (e.g., the UL band 408) may be replaced with a UL sub-band, a DL sub-band, and/or guard bands. Alternatively or additionally, the sub-bands and/or guard bands shown by the time duration 412 and/or the time duration 414 may be replaced by a full band. In some aspects, the sub-bands and/or guard bands shown by the time duration 412 and/or the time duration 414 may be replaced with a sub-band and/or a guard band that has a different size.

As indicated above, FIG. 4 is provided as an example. Other examples may differ from what is described with respect to FIG. 4.

Figure 5:
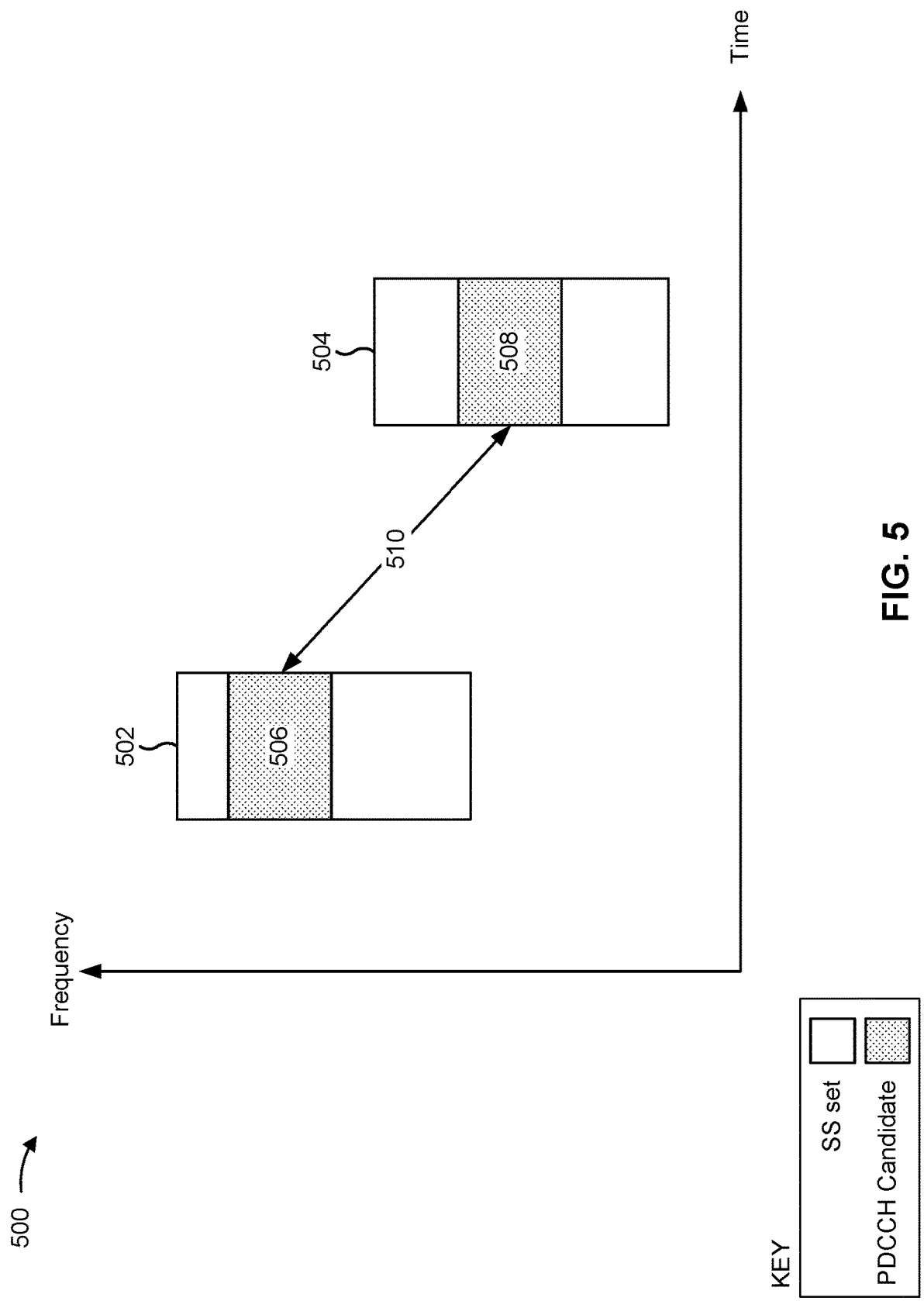
FIG. 5 is a diagram illustrating an example of physical downlink control channel (PDCCH) repetition, in accordance with the present disclosure.

FIG. 5 is a diagram illustrating an example 500 of PDCCH repetition, in accordance with the present disclosure.

Communications between a network node (e.g., a network node 110) and a UE (e.g., a UE 120) may include downlink communications from the network node to the UE and/or uplink communications from the UE to the network node. The downlink communications may include control information, such as downlink control information (DCI) and downlink payload data. In some aspects, the UE and/or the network node may use the control information to transmit and/or receive data communications. For instance, the control information may include DCI indicating, by way of example and not of limitation, a resource block assignment and/or a modulation and coding scheme, which the UE may utilize to receive and decode the downlink payload data.

In some aspects, the UE may receive the DCI via a PDCCH, and the UE may receive the PDCCH based at least in part on a search space set and/or one or more PDCCH candidates. A "search space set" may denote a group of all air interface resources that may potentially be used to carry PDCCH. As one example, a search space may be based at least in part on a core resource set (CORESET). A "PDCCH candidate" may denote one or more particular air interface resources within a search space set that may be used to carry PDCCH, and may alternatively be referred to as a monitoring occasion (MO) and/or a PDCCH occasion. Accordingly, a PDCCH candidate may refer to a portion of a search space set, and a UE may monitor each PDCCH candidate within a search space set to receive the PDCCH.

In some aspects, one or more PDCCH candidates may be associated with one or more search space sets. To illustrate, a first search space set 502 and/or a second search space set 504 may be based at least in part on air interface resources that are characterized, at least in part, by one or more time durations (shown on a horizontal axis) and/or one or more frequency portions (shown on a vertical axis). For example, the first search space set 502 may be based at least in part on a first CORESET, and the second search space set 504 may be based at least in part on a second, different CORESET. As shown by the example 500, the first search space set 502 may include at least a first PDCCH candidate 506, and the second search space set 504 may include at least a second PDCCH candidate 508. However, in other examples, a search space set may include more PDCCH candidates. The UE may monitor the PDCCH candidates in the search space sets, receive a PDCCH using a PDCCH candidate, and/or decode the PDCCH to recover the DCI.

In some cases, to enable adequate reception of the DCI (e.g., recovery of the DCI with a number of bit errors that satisfies an error threshold), the network node and the UE may use PDCCH repetition. PDCCH repetition may be associated with one or more network nodes transmitting repetitions of a PDCCH using a plurality of instances of the PDCCH candidates. For instance, a network node, a TRP, and/or a group of network nodes (or TRPs) may transmit a PDCCH based at least in part on using the first PDCCH candidate 506 (e.g., PDCCH repetition 1) and a repetition of the PDCCH using the second PDCCH candidate 508 (e.g., PDCCH repetition 2). Alternatively, a first network node and/or first TRP may transmit the PDCCH repetition 1, and a second network node and/or second TRP may transmit the PDCCH repetition 2. In an example, the PDCCH repetition 1 and the PDCCH repetition 2 may include the same information and/or substantially the same (e.g., the same information carried in both the PDCCH repetition 1 and the PDCCH repetition 2 meets a percentage threshold). To illustrate, the PDCCH repetition 1 and the PDCCH repetition 2 may include and/or indicate a same DCI payload, a same aggregation level (e.g., the same number of control channel elements), and/or the same coded bits.

As shown by reference number 510, two PDCCH candidates in different search space sets may be linked together to indicate a potential of DCI repetition and/or PDCCH repetition. For example, a PDCCH candidate and/or MO of a first search space set may be linked with a PDCCH candidate and/or MO of a second search space set. In some aspects, a linkage between PDCCH candidates in different search space sets may use a one-to-one mapping between PDCCH candidates. To illustrate, the linkage shown by reference number 510 may indicate that the first PDCCH candidate 506 is only linked to the second PDCCH candidate 508 (and vice versa).

In some aspects, the UE may be configured (e.g., via a radio resource control (RRC) message) to link the first PDCCH candidate 506 and the second PDCCH candidate 508 (and/or the first search space set 502 and the second search space set 504) for receiving PDCCH repetitions. Accordingly, and based at least in part on the linkage shown by reference number 510, the UE may receive the PDCCH repetition 1 based at least in part on using the first PDCCH candidate 506, receive the PDCCH repetition 2 based at least in part on using the second PDCCH candidate 508, and perform soft combining of the PDCCH repetitions to decode the DCI. Soft combining may include storing multiple repetitions of the DCI and combining the multiple repetitions to determine a most likely value of the DCI.

As indicated above, FIG. 5 is provided as an example. Other examples may differ from what is described with regard to FIG. 5.

Figure 6:
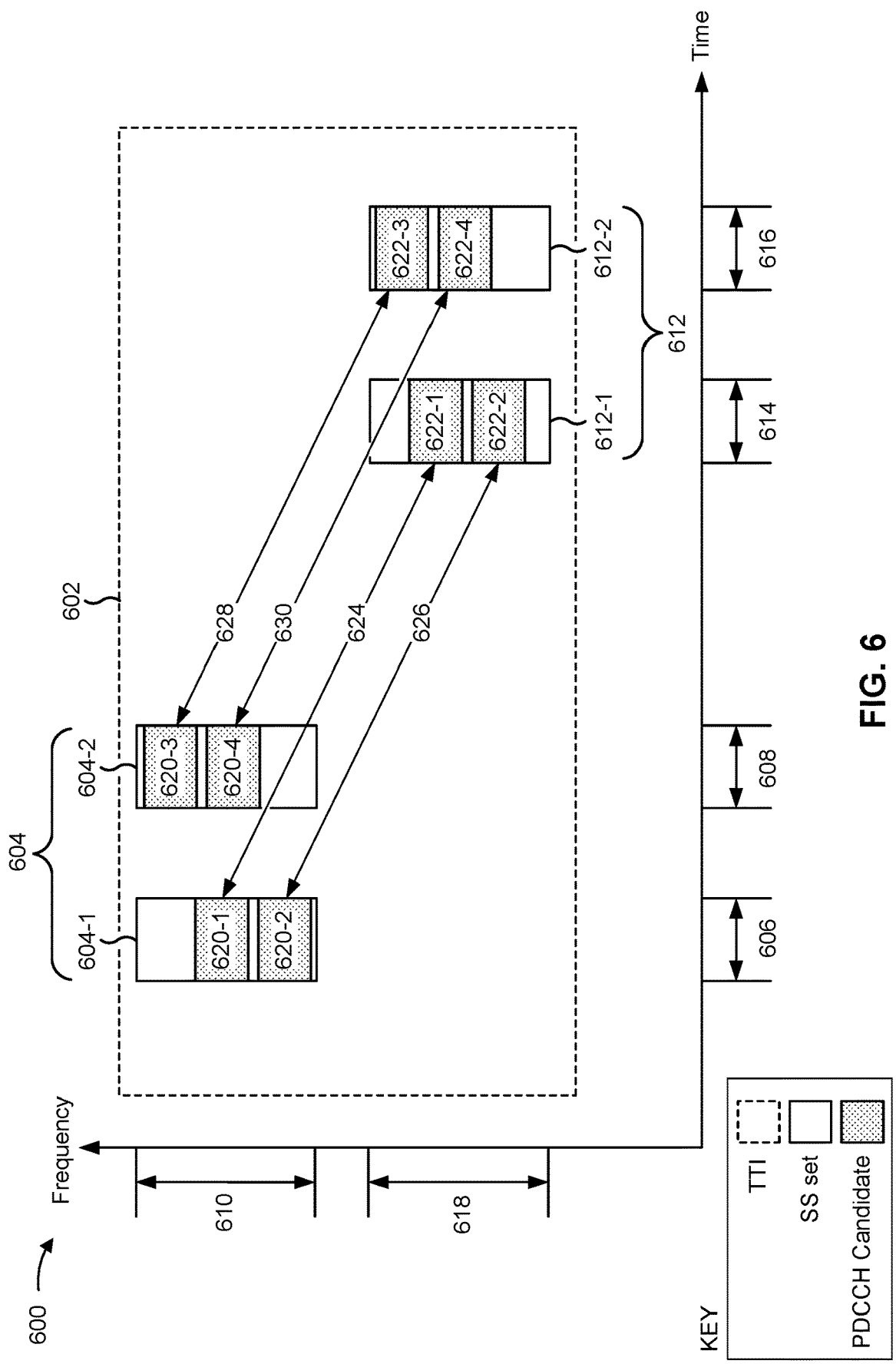
FIG. 6 is a diagram illustrating an example of intra-slot PDCCH repetition, in accordance with the present disclosure.

FIG. 6 is a diagram illustrating an example 600 of intra-slot PDCCH repetition, in accordance with the present disclosure.

"Intra-slot PDCCH repetition" may denote PDCCH repetition that is based at least in part on a linkage between a first PDCCH candidate and a second PDCCH candidate that occur within a same time slot and/or TTI. To illustrate, intra-slot PDCCH repetition may be based at least in part on a TTI 602 (shown with a dashed line) that spans a time duration (shown on a horizontal axis). The time duration of the TTI 602 may be partitioned into any combination of units, such as, by way of example and not of limitation, a symbol, a mini-slot, a slot, a sub-frame, and/or a frame. Alternatively or additionally, intra-slot PDCCH repetition may be based at least in part on one or more search space sets that span one or more frequency bands (shown on a vertical axis). For example, the TTI 602 may include a first search space set 604 (shown as including search space 604-1 and search space 604-2) that may be characterized based at least in part on a first time duration 606, a second time duration 608, and/or a first frequency span 610. In some aspects, the first search space set 604 may be based at least in part on a first CORESET. Alternatively or additionally, the TTI 602 may include a second search space set 612 (shown as including search space 612-2 and search space 612-2) that may be characterized based at least in part on a third time duration 614, a fourth time duration 616, and/or a second frequency span 618.

As shown by the example 600, a PDCCH candidate within the first search space set 604 may be linked to a PDCCH candidate within the second search space set 612 (e.g., via an RRC message to a UE that indicates the linkage). To illustrate, the first search space set 604 may include a first PDCCH candidate 620-1, a second PDCCH candidate 620-2, a third PDCCH candidate 620-3, and/or a fourth PDCCH candidate 620-4. Alternatively, or additionally, the second search space set 612 may include a first PDCCH candidate 622-1, a second PDCCH candidate 622-2, a third PDCCH candidate 622-3, and/or a fourth PDCCH candidate 622-4. Based at least in part on a one-to-one relationship, the first PDCCH candidate 620-1 may be linked to the first PDCCH candidate 622-1 as shown by reference number 624, the second PDCCH candidate 620-2 may be linked to the second PDCCH candidate 622-2 as shown by reference number 626, the third PDCCH candidate 620-3 may be linked to the third PDCCH candidate 622-3 as shown by reference number 628, and/or the fourth PDCCH candidate 620-4 may be linked to the fourth PDCCH candidate 622-4 as shown by reference number 630, Intra-slot PDCCH linkages may be configured (e.g., RRC configured) based at least in part on one or more levels that specify one or more rules for the linkage. As one example, a Level 1 linkage may indicate that a linkage may only occur between PDCCH candidates that are located within a UE-specific search space (USS) and/or a Type3 common search space (CSS). A Type3 CSS may denote a particular CSS configuration and/or PDCCH configuration that may be used to transmit a PDCCH using the CSS. Accordingly, a Level 1 linkage may indicate that linkages of PDCCH candidates that are based at least in part on other types of CCS (e.g., a Type0 CSS, a Type0A CSS, a Type1 CSS, and/or a Type2 CSS) is unsupported and/or disallowed. In some aspects, the Level 1 linkage may indicate that a linkage to a PDCCH candidate within a recovery search space may be unsupported and/or disallowed. Alternatively, or additionally, a Level 1 linkage may indicate that linked search space sets (and/or PDCCH candidates within the linked search space sets) are configured with any combination of a same periodicity, a same slot offset, a same time duration, a same search space set type, and/or a same DCI format.

As another example, a Level 2 linkage may indicate that, for a given time slot and/or TTI, the linkage for an n-th PDCCH candidate and/or MO of a first search space set is linked to the n-th monitoring occasion of a second search space set, where n is an integer. To illustrate, for a Level 2 linkage, the first PDCCH candidate 620-1 associated with the first search space set 604 may only be linked to the first PDCCH candidate 622-1 of the second search space set 612 based at least in part on each candidate being a first PDCCH candidate in the respective search space set. Alternatively, or additionally, a Level 2 linkage may indicate that each linked search space set (e.g., the first search space set 604 that is linked to the second search space set 612 based at least in part on a linkage between PDCCH candidates) includes a same number of PDCCH candidates and/or MOs within the time slot and/or TTI (e.g., the TTI 602).

As yet another example, a Level 3 linkage may indicate that two linked PDCCH candidates are configured with a same aggregation level and a same PDCCH candidate index (e.g., a starting control channel element (CCE) index within the search space set of the PDCCH candidate). Alternatively, or additionally, a Level 3 linkage may indicate that two linked search space sets are configured with a same number of PDCCH candidates for each aggregation level.

In some aspects, a first PDCCH candidate may occur in a slot with a different configuration relative to the linked PDCCH candidate. To illustrate, the TTI 602 may be configured with an SBFD format as described with regard to FIG. 4. Accordingly, the TTI 602 may include a half-duplex downlink that is configured with an entirety of an available bandwidth (e.g., the DL band 404 positioned at the time duration 406 as described with regard to FIG. 4) and/or a full-duplex downlink slot that uses a portion of the available bandwidth (e.g., the DL sub-band 416a, the DL sub-band 416-b, the DL sub-band 416c, and/or the DL sub-band 416-d as described with regard to FIG. 4). In some aspects, and based at least in part on using the SBFD format, a first PDCCH candidate that occurs in a half-duplex slot may link to a second PDCCH candidate that occurs in a full-duplex slot. Accordingly, a first PDCCH transmission that is based at least in part on a first PDCCH candidate that is linked to a second PDCCH candidate may use a same configuration as a second PDCCH transmission that uses the second PDCCH candidate.

To illustrate, based at least in part on a Level 3 linkage, transmissions that use the first PDCCH candidate and the second PDCCH candidate may be configured with a same aggregation level. In some aspects, an aggregation level configuration may be based at least in part on a bandwidth. For instance, a first transmission in a wider bandwidth (e.g., a half-duplex bandwidth) may be configured and/or may support a higher aggregation level relative to a second transmission in a narrower bandwidth (e.g., a full-duplex bandwidth). For a linkage that is based at least in part on different slot types, a PDCCH candidate (and/or a PDCCH transmission that uses the PDCCH candidate) may use a lower aggregation level than what is available and/or supported. For instance, a first PDCCH candidate may occur in a half-duplex slot associated with the half-duplex bandwidth, and a linked, second PDCCH candidate may occur in a full-duplex slot with a reduced bandwidth (e.g., relative to a half-duplex slot). Based at least in part on using a Level 3 linkage, the linked PDCCH candidates (and corresponding transmissions) would be based at least in part on a lower aggregation level associated with the narrower bandwidth. In some aspects, the lower aggregation level may result in reduced link performance and, subsequently, increased recovery errors. Increased recovery errors in DCI at a UE may lead to interruptions and/or a stoppage of communications between the UE and a network node.

Some techniques and apparatuses described herein provide PDCCH linkage across different slots. In some aspects, a UE may receive a PDCCH linkage indication that is based at least in part on a slot configuration. That is, the PDCCH linkage indication may specify the slot configuration as a condition for an occurrence of the PDCCH linkage. Based at least in part on the PDCCH linkage indication, the UE may receive a first PDCCH in a first PDCCH occasion and a second PDCCH that is a repetition of the first PDCCH in a second PDCCH occasion. In some aspects, the second PDCCH occasion may be based at least in part on an occurrence of one or more air interface resources configured with the slot configuration.

In some aspects, a network node may transmit a PDCCH linkage indication that is based at least in part on a slot configuration. To illustrate, the PDCCH linkage indication may specify the slot configuration as a condition for an occurrence of the PDCCH linkage. Based at least in part on the PDCCH linkage indication, the network node may transmit a first PDCCH in a first PDCCH occasion and/or a second PDCCH that is a repetition of the first PDCCH in a second PDCCH occasion. The second PDCCH occasion may be based at least in part on an occurrence of one or more air interface resources that are configured with the slot configuration.

Indicating a PDCCH linkage that is based at least in part on a slot configuration enables a network node to configure PDCCH repetition and/or how a UE receives PDCCH repetition. In some aspects, the network node may configure PDCCH repetition to improve reception of DCI by the UE. To illustrate, in some aspects, the network node may indicate a slot configuration that results in the UE refraining from receiving a PDCCH repetition in a full-duplex slot with a smaller bandwidth relative to a half-duplex slot. For example, a channel condition metric may fail to satisfy a quality threshold, and the network node may determine to use a higher aggregation level for PDCCH repetition transmissions (e.g., a higher aggregation level that is unsupported by the smaller bandwidth) to reduce recovery errors. In selecting the higher aggregation level, the network node may configure a PDCCH linkage with a half-duplex slot configuration such that a UE would refrain from receiving a PDCCH in the full-duplex slot as a PDCCH repetition. As another example, the channel condition may satisfy the quality threshold, and the network node may determine to use a lower aggregation level for PDCCH repetition transmissions and, subsequently, to use a full-duplex slot for a PDCCH repetition transmission to enable faster reception of the PDCCH repetition transmissions. The ability to configure how the UE receives PDCCH repetitions may improve DCI reception by reducing recovery errors and/or reducing a latency in a UE response to information in the DCI.

As indicated above, FIG. 6 is provided as an example. Other examples may differ from what is described with regard to FIG. 6.

Figure 7:
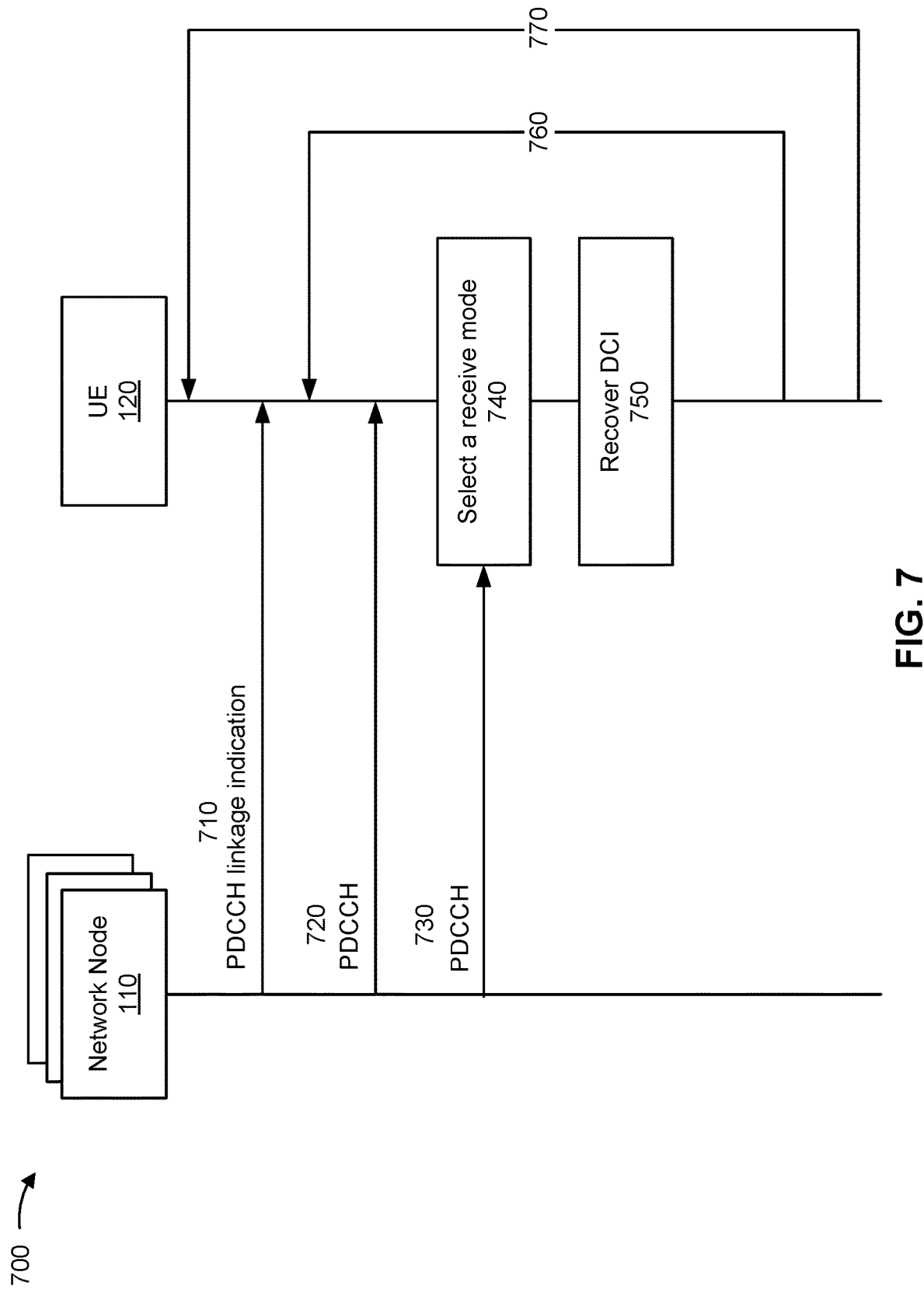
FIG. 7 is a diagram illustrating an example of a wireless communication process between one or more network nodes and a UE, in accordance with the present disclosure.

FIG. 7 is a diagram illustrating an example 700 of a wireless communication process between one or more network nodes (e.g., one or more network nodes 110) and a UE (e.g., the UE 120), in accordance with the present disclosure. As one example, the one or more network nodes may include multiple TRPs that are in communication with the UE 120.

As shown by reference number 710, one or more network nodes 110 may transmit, and a UE 120 may receive, a PDCCH linkage indication. To illustrate, a single network node 110 may transmit the PDCCH linkage indication, or a group of network nodes 110 (e.g., a group of TRPs) may transmit the PDCCH linkage indication. In some aspects, the PDCCH linkage indication may specify a slot configuration associated with the PDCCH linkage and/or may specify configuration information (e.g., a linkage type and/or a receive mode configuration) associated with the PDCCH linkage. The slot configuration may indicate a condition (e.g., an occurrence of air interface resources with the slot configuration) for the PDCCH linkage to exist and/or occur. For example, the slot configuration may indicate a slot type, a bandwidth size, and/or a sub-band size. The slot type may indicate any type of slot, such as a full-duplex slot type (e.g., a particular full-duplex slot type configured with any combination of downlink and/or uplink sub-bands or generically indicate a full-duplex slot type) or a half-duplex slot type. Accordingly, and based at least in part on the PDCCH linkage indication specifying a slot configuration, the PDCCH linkage indication may specify that the PDCCH linkage for PDCCH repetition may exist and/or occur when one or more air interface resources configured with the indicated slot configuration occur (e.g., an occurrence of air interface resources configured as a full-duplex slot, an occurrence of air interface resources configured with an indicated bandwidth, and/or an occurrence of air interface resources configured with an indicated sub-band). In other examples, however, the slot configuration may indicate a condition for the PDCCH linkage to be broken. For example, an occurrence of air interface resources with the slot configuration may indicate that a linkage between PDCCH candidates does not exist and/or that PDCCH repetition is disabled in the linked PDCCH candidate (e.g., a second-in-time PDCCH candidate that is linked to a first-in-time linked PDCCH candidate).

In some aspects, the network node(s) 110 may transmit the PDCCH linkage indication based at least in part on including the PDCCH linkage indication in an RRC message. Alternatively, or additionally, the network node(s) 110 may transmit an indication of the slot configuration in a same RRC message as the PDCCH linkage indication, or in a different RRC message. In some aspects, the RRC message may include one or more parameters associated with a configuration of the PDCCH linkage. Alternatively or additionally, the RRC message may include a value and/or a bit field that maps to the configuration of the PDCCH linkage, such as a first PDCCH linkage configuration that is specified by a communication standard and/or a second PDCCH linkage configuration that is specified in an RRC configured table and/or mapping.

The network node(s) 110 may transmit a configuration indication as part of the PDCCH linkage indication or in a separate message from the PDCCH linkage indication. As one example, the configuration indication may specify a receive mode to use for receiving a transmission in a linked PDCCH candidate. Alternatively or additionally, the configuration indication may specify a conditional receive mode to use, such as an indication to use a first (conditional) receive mode based at least in part on performing blind decoding on transmissions received in a number of PDCCH occasions that fail to satisfy a maximum threshold and/or to use a second (conditional) receive mode based at least in part on the number of the PDCCH occasions satisfying the maximum threshold. To illustrate, the network node(s) 110 may indicate to use, as the first (conditional) receive mode, an independent PDCCH receive mode, and to use, as the second (conditional) receive mode, a refrained receive mode (or vice versa). An independent PDCCH mode may include a UE receiving a PDCCH in a PDCCH candidate and/or a PDCCH occasion as an independent PDCCH (e.g., a PDCCH that is not a PDCCH repetition), and a refrained receive mode may include the UE refraining to receive a PDCCH in the PDCCH candidate and/or PDCCH occasion. In some aspects, the configuration indication may specify to use a PDCCH repetition receive mode (e.g., receive a transmission in a PDCCH candidate as a PDCCH repetition), either implicitly or explicitly. Alternatively, or additionally, the configuration indication may specify the maximum threshold.

While the example 700 shows the network node(s) 110 transmitting the PDCCH linkage indication, other examples may include the PDCCH linkage indication being based at least in part on a communication standard. For example, the communication standard may specify the configuration information (e.g., the first receive mode, the second receive mode, and/or the maximum threshold), a mapping a slot configuration, and/or a mapping to a PDCCH linkage configuration As shown by reference number 720, the one or more network nodes 110 may transmit, and the UE 120 may receive, a first PDCCH (e.g., a first PDCCH transmission and/or a first PDCCH repetition). In some aspects, a single network node 110 may transmit the first PDCCH, while in other aspects, multiple network nodes (e.g., multiple TRPs) may transmit the first PDCCH. As further described with regard to FIG. 5 and FIG. 6, the network node(s) 110 may transmit the first PDCCH based at least in part on a PDCCH occasion and/or a CORESET.

In some aspects, the UE 120 may receive the first PDCCH as an independent PDCCH based at least in part on the PDCCH linkage indication and/or the slot configuration indicating that the first PDCCH is an independent PDCCH. That is, the UE 120 may recover DCI from the first PDCCH without waiting for a PDCCH repetition based at least in part on determining that air interface resources associated with a linked, subsequent PDCCH occasion fail to satisfy the slot configuration. In other aspects, the UE 120 may receive the first PDCCH as a PDCCH repetition based at least in part on determining that air interface resources associated with the linked, subsequent PDCCH occasion satisfy the slot configuration. To illustrate, the UE 120 may refrain from recovering DCI until receiving a PDCCH repetition in the linked, subsequent PDCCH occasion.

As shown by reference number 730, the one or more network nodes 110 may transmit, and the UE 120 may receive, a second PDCCH (e.g., a second, independent PDCCH transmission or a PDCCH repetition). A same network node may transmit the first PDCCH and the second PDCCH, different network nodes may transmit the first PDCCH and second PDCCH, respectively, and/or multiple network nodes (e.g., multiple TRPs) may transmit the first PDCCH and/or the second PDCCH. Alternatively, the UE 120 may refrain from receiving the second PDCCH as described below.

While the example 700 shows the network node(s) 110 transmitting the second PDCCH, other examples may include the network node(s) 110 refraining from transmitting the second PDCCH. For instance, the network node(s) may identify that the air interface resources associated with the second PDCCH occasion have a different slot configuration than the slot configuration associated with the PDCCH linkage. Accordingly, the network node(s) 110 may refrain from transmitting the second PDCCH.

As shown by reference number 740, the UE 120 may select a receive mode associated with receiving (or refraining to receive) the second PDCCH. For example, the UE 120 may select a PDCCH repetition receive mode to receive the second PDCCH. To illustrate, the UE 120 may identify that air interface resources associated with a second PDCCH occasion for receiving the second PDCCH are configured with the slot configuration indicated by the network node(s) 110 as described with regard to reference number 710. Accordingly, the UE 120 may select the PDCCH repetition receive mode, and receive the second PDCCH as a PDCCH repetition.

As another example, the UE 120 may select a refrain receive mode or an independent PDCCH receive mode. To illustrate, the UE 120 may identify that the air interface resources associated with the second PDCCH occasion are configured with a different slot configuration than the slot configuration indicated by the network node(s) 110. Based at least in part on identifying that the second PDCCH occasion has a different slot configuration, the UE 120 may select a refrained receive mode that results in the UE 120 refraining from receiving the second PDCCH. Alternatively, the UE 120 may select an independent PDCCH receive mode and receive the second PDCCH as being independent from, and/or not linked to, another PDCCH.

In some aspects, the UE 120 may select a receive mode based at least in part on a number of PDCCH occasions associated with the UE 120 performing blind decoding. For instance, the UE 120 may determine that the UE 120 has performed blind decoding based at least in part on a first number of PDCCH occasions, and that the first number satisfies a maximum threshold. That is, the UE 120 may receive a respective transmission in each of the first number of PDCCH occasions, and perform blind decoding on each transmission. The UE 120 may select, for receiving the second PDCCH associated with the second PDCCH occasion, a refrained receive mode based at least in part on the first number satisfying the maximum threshold. Alternatively, the UE 120 may determine that the UE 120 has performed blind decoding for a second number of transmissions that are received using the second number of PDCCH occasions, and that the second number fails to satisfy the maximum threshold. Accordingly, the UE 120 may select an independent PDCCH receive mode to receive the second PDCCH based at least in part on the second number failing to satisfy the maximum threshold.

The UE 120 may select the receive mode based at least in part on any combination of a PDCCH linkage indication from a network node, a slot configuration, and/or a communication standard. To illustrate, the communication standard and/or a network node may specify any combination of the maximum threshold, a first receive mode for receiving a PDCCH if the number of PDCCH occasions fails to satisfy the maximum threshold, and/or a second receive mode for receiving a PDCCH if the number of PDCCH occasions satisfies the maximum threshold as described above.

In some aspects, the UE may select a receive mode based at least in part on the slot configuration specifying that an occurrence of air interface resources with the slot configuration indicates that a PDCCH linkage exists, such as by selecting a PDCCH repetition receive mode when the PDCCH linkage exists and selecting a refrained receive mode when the PDCCH linkage does not exist. However, in some aspects, the slot configuration may alternatively specify that an occurrence of air interface resources with the slot configuration indicates that a PDCCH linkage does not exist and/or is broken. Accordingly, the UE 120 may select a receive mode based at least in part on the slot configuration indicating when a PDCCH linkage exists (e.g., at an occurrence of the slot configuration or without the occurrence of the slot configuration) and/or indicating when the PDCCH linkage does not exist and/or is broken (e.g., without the occurrence of the slot configuration or at an occurrence of the slot configuration).

As shown by reference number 750, the UE 120 may recover DCI based at least in part on one or more of the first PDCCH and/or the second PDCCH. As one example, the UE 120 may recover first DCI from the first PDCCH and/or second DCI from the second PDCCH based at least in part on receiving the first PDCCH and/or the second PDCCH as independent PDCCH. In some aspects, the UE 120 may refrain from recovering the second DCI from the second PDCCH based at least in part on refraining from receiving the second PDCCH. As another example, the UE 120 may recover DCI based at least in part on receiving the first PDCCH and the second PDCCH as PDCCH repetitions and soft combining the first PDCCH and the second PDCCH to recover the DCI.

As shown by reference number 760, the one or more network nodes 110 may repeatedly transmit, and the UE 120 may repeatedly receive, a first PDCCH and/or a second PDCCH based at least in part on the selected receive mode. For example, the UE 120 may repeatedly select a receive mode based at least in part on an occurrence of the slot configuration associated with the PDCCH linkage. To illustrate, the UE 120 may select an independent PDCCH receive mode, a refrained receive mode, or a PDCCH repetition mode for a third PDCCH transmitted using a third PDCCH candidate and/or a fourth PDCCH transmitted using a fourth PDCCH candidate, where the selected receive modes differ from those used to receive the first PDCCH and/or the second PDCCH. That is, the third PDCCH candidate and/or occasion may have a different slot configuration and/or a same slot configuration as the slot configuration associated with the PDCCH linkage, and the UE 120 may dynamically select a receive mode for the third PDCCH based at least in part on the associated slot configuration. As another example, and based at least in part on the associated slot configurations, the UE 120 may receive the second PDCCH as a PDCCH repetition in a first iteration of a slot and/or TTI, and may refrain from receiving the second PDCCH in a second iteration of the slot and/or the TTI.

As shown by reference number 770, the one or more network nodes 110 may repeatedly transmit, and the UE 120 may repeatedly receive, an indication of an updated PDCCH linkage. For example, the network node(s) 110 may transmit an updated slot configuration, an updated maximum threshold, and/or an updated number of PDCCH occasions based at least in part on a change in a channel condition. Accordingly, the UE 120 may modify a selection algorithm that selects the receive mode based at least in part on the updated slot configuration, the updated maximum threshold, and/or the updated number of PDCCH occasions.

Indicating a PDCCH linkage that is based at least in part on a slot configuration enables a network node to configure PDCCH repetition and/or how a UE receives PDCCH in linked and/or unlinked PDCCH candidates and/or PDCCH occasions. In some aspects, the network node may configure PDCCH repetition to improve reception of DCI by the UE, such as by selecting and indicating a first slot configuration associated with a PDCCH linkage based at least in part on using a higher aggregation level for PDCCH repetition transmissions (e.g., a higher aggregation level that is unsupported by the smaller bandwidth) to reduce recovery errors. Alternatively or additionally, the network node may select and/or indicate a second slot configuration to associate with the PDCCH linkage based at least in part on selecting a lower aggregation level to enable faster reception of the PDCCH repetition transmissions (e.g., by reducing a number of times the UE selects a refrained receive mode). In some aspects, the network node may select the different slot configurations associated with a PDCCH linkage based at least in part on a channel condition. The ability to configure how the UE receives PDCCH repetitions may improve DCI reception by reducing recovery errors and/or reducing a latency in a UE response to information in the DCI.

As indicated above, FIG. 7 is provided as an example. Other examples may differ from what is described with regard to FIG. 7.

Figure 8:
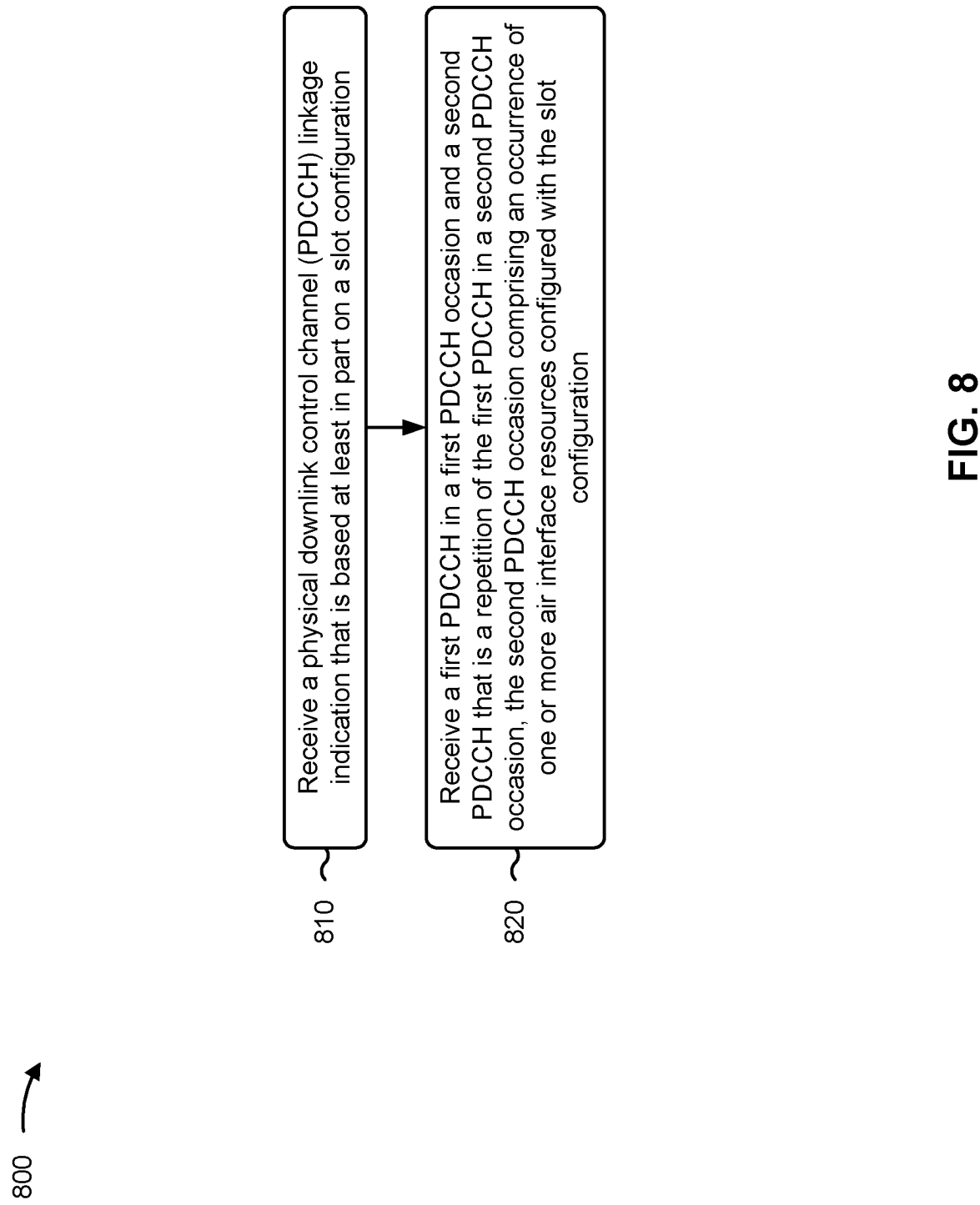
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with PDCCH linkage for different slots.

As shown in FIG. 8, in some aspects, process 800 may include receiving a PDCCH linkage indication that is based at least in part on a slot configuration (block 810). For example, the UE (e.g., using communication manager 140 and/or reception component 1002, depicted in FIG. 10) may receive a PDCCH linkage indication that is based at least in part on a slot configuration, as described above.

As further shown in FIG. 8, in some aspects, process 800 may include receiving a first PDCCH in a first PDCCH occasion and a second PDCCH that is a repetition of the first PDCCH in a second PDCCH occasion, the second PDCCH occasion being an occurrence of one or more air interface resources configured with the slot configuration (block 820). For example, the UE (e.g., using communication manager 140 and/or reception component 1002, depicted in FIG. 10) may receive a first PDCCH in a first PDCCH occasion and a second PDCCH that is a repetition of the first PDCCH in a second PDCCH occasion, the second PDCCH occasion being an occurrence of one or more air interface resources configured with the slot configuration, as described above.

Process 800 may include additional aspects, such as any single aspect or any combination of aspects described below and/or in connection with one or more other processes described elsewhere herein.

In a first aspect, the slot configuration includes at least one of a slot type, a bandwidth size, or a sub-band size. The slot type may indicate, for example, a full-duplex slot type (e.g., a particular full-duplex slot type configured with any combination of downlink and/or uplink sub-bands or generically indicate a full-duplex slot type) or a half-duplex slot type.

In a second aspect, receiving the PDCCH linkage indication includes receiving an RRC message that includes the PDCCH linkage indication.

In a third aspect, process 800 includes receiving, in the RRC message, an indication of the slot configuration.

In a fourth aspect, the slot configuration indicates a first slot configuration, and process 800 includes identifying a third PDCCH occasion that includes an occurrence of one or more additional air interface resources configured with a second slot configuration that is different from the first slot configuration, and refraining from receiving a third PDCCH in the third PDCCH occasion based at least in part on the second slot configuration being different from the first slot configuration.

In a fifth aspect, the slot configuration indicates a first slot configuration, and process 800 includes identifying a third PDCCH occasion that includes an occurrence of one or more additional air interface resources configured with a second slot configuration that is different from the first slot configuration, and receiving, in the third PDCCH occasion and based at least in part on the second slot configuration being different from the first slot configuration, a third PDCCH using an independent PDCCH receive mode.

In a sixth aspect, process 800 includes performing blind decoding for a number of PDCCH occasions, and selecting, for a third PDCCH associated with a third PDCCH occasion, a receive mode for the third PDCCH based at least in part on a determination of whether the number of the PDCCH occasions satisfies a maximum threshold.

In a seventh aspect, the number of the PDCCH occasions fails to satisfy the maximum threshold, selecting the receive mode includes selecting an independent PDCCH receive mode, and the process 800 includes receiving, based at least in part on using the independent PDCCH receive mode, the third PDCCH as being independent of the first PDCCH and the second PDCCH.

In an eighth aspect, the number of the PDCCH occasions satisfies the maximum threshold, selecting the receive mode includes selecting a refrained receive mode, and the process 800 includes refraining from receiving the third PDCCH based at least in part on using the refrained receive mode.

In a ninth aspect, the one or more air interface resources associated with the third PDCCH occasion are configured with the slot configuration, and selecting the receive mode is based at least in part on the one or more air interface resources associated with the third PDCCH occasion being configured with the slot configuration.

In a tenth aspect, process 800 includes receiving a configuration indication that specifies to use at least one of a first receive mode based at least in part on the number of the PDCCH occasions failing to satisfy the maximum threshold, or a second receive mode based at least in part on the number of the PDCCH occasions satisfying the maximum threshold.

In an eleventh aspect, the configuration indication specifies that the first receive mode is an independent PDCCH receive mode and the second receive mode is a refrained receive mode, or the first receive mode is the refrained receive mode and the second receive mode is the independent PDCCH receive mode.

In a twelfth aspect, selecting the receive mode is based at least in part on a communication standard that specifies to use at least one of a first receive mode based at least in part on the number of the PDCCH occasions failing to satisfy the maximum threshold, or a second receive mode based at least in part on the number of the PDCCH occasions satisfying the maximum threshold.

In a thirteenth aspect, the communication standard specifies that the first receive mode is an independent PDCCH receive mode and the second receive mode is a refrained receive mode, or the first receive mode is the refrained receive mode and the second receive mode is the independent PDCCH receive mode.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
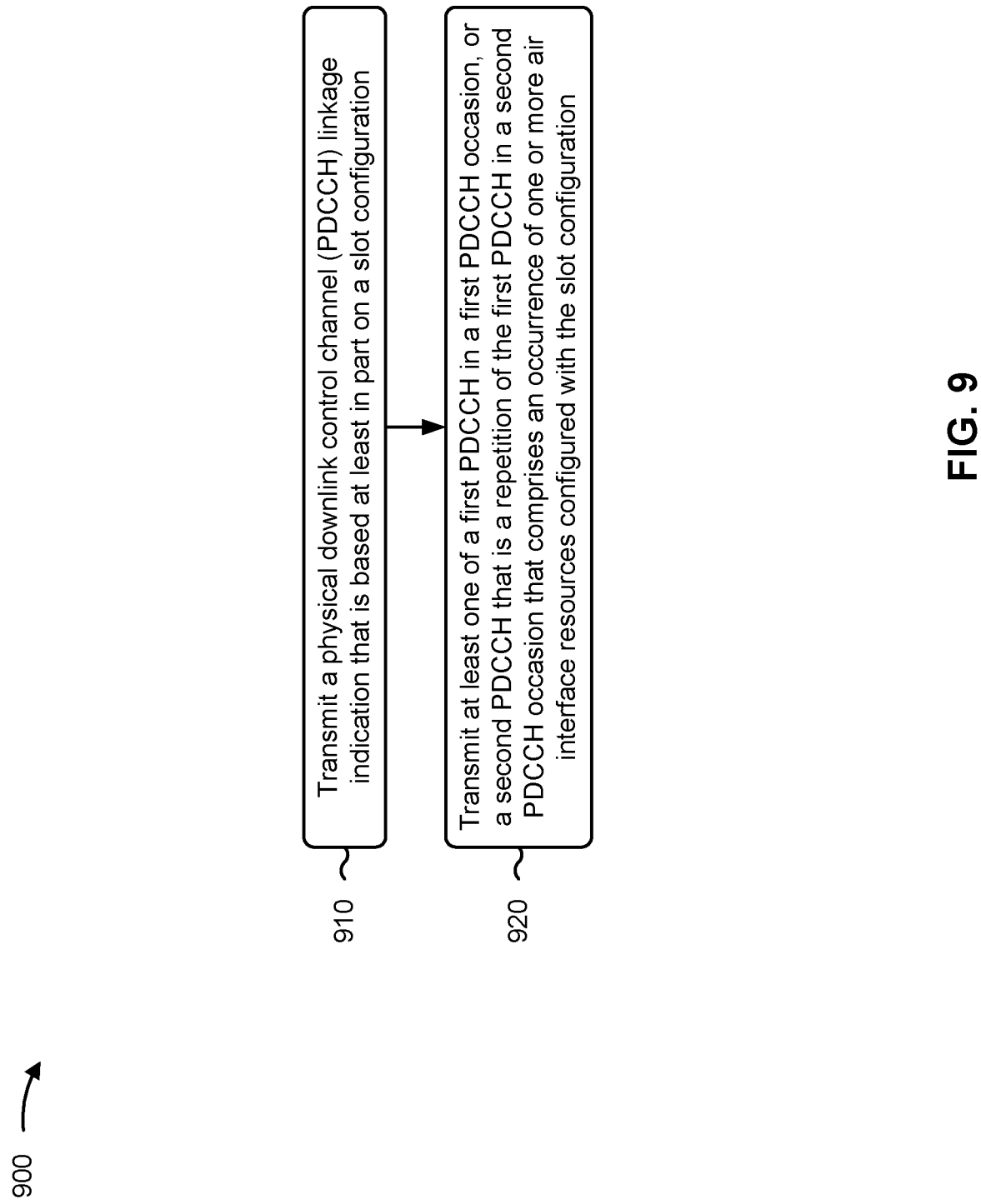
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 110) performs operations associated with PDCCH linkage for different slots.

As shown in FIG. 9, in some aspects, process 900 may include transmitting a PDCCH linkage indication that is based at least in part on a slot configuration (block 910). For example, the network node (e.g., using communication manager 150 and/or transmission component 1104, depicted in FIG. 11) may transmit a PDCCH linkage indication that is based at least in part on a slot configuration, as described above.

As further shown in FIG. 9, in some aspects, process 900 may include transmitting at least one of: a first PDCCH in a first PDCCH occasion, or a second PDCCH that is a repetition of the first PDCCH in a second PDCCH occasion that includes an occurrence of one or more air interface resources configured with the slot configuration (block 920). For example, the network node (e.g., using communication manager 150 and/or transmission component 1104, depicted in FIG. 11) may transmit at least one of: a first PDCCH in a first PDCCH occasion, or a second PDCCH that is a repetition of the first PDCCH in a second PDCCH occasion that includes an occurrence of one or more air interface resources configured with the slot configuration, as described above.

Process 900 may include additional aspects, such as any single aspect or any combination of aspects described below and/or in connection with one or more other processes described elsewhere herein.

In a first aspect, the slot configuration includes at least one of a slot type, a bandwidth size, or a sub-band size. The slot type may indicate, for example, a full-duplex slot type (e.g., a particular full-duplex slot type configured with any combination of downlink and/or uplink sub-bands or generically indicate a full-duplex slot type) or a half-duplex slot type.

In a second aspect, transmitting at least one of the first PDCCH in the first PDCCH occasion or the second PDCCH in the second PDCCH occasion includes transmitting both of the first PDCCH in the first PDCCH occasion and the second PDCCH in the second PDCCH occasion.

In a third aspect, transmitting at least one of the first PDCCH in the first PDCCH occasion or the second PDCCH in the second PDCCH occasion includes transmitting only one of the first PDCCH in the first PDCCH occasion or the second PDCCH in the second PDCCH occasion.

In a fourth aspect, transmitting the PDCCH linkage indication includes transmitting an RRC message that includes the PDCCH linkage indication.

In a fifth aspect, transmitting the RRC message further includes transmitting, in the RRC message, an indication of the slot configuration.

In a sixth aspect, process 900 includes transmitting a configuration indication that specifies to use at least one of a first receive mode based at least in part on a number of PDCCH occasions failing to satisfy a maximum threshold, or a second receive mode based at least in part on the number of the PDCCH occasions satisfying the maximum threshold.

In a seventh aspect, the configuration indication specifies that the first receive mode is an independent PDCCH receive mode and the second receive mode is a refrained receive mode, or the first receive mode is the refrained receive mode and the second receive mode is the independent PDCCH receive mode.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
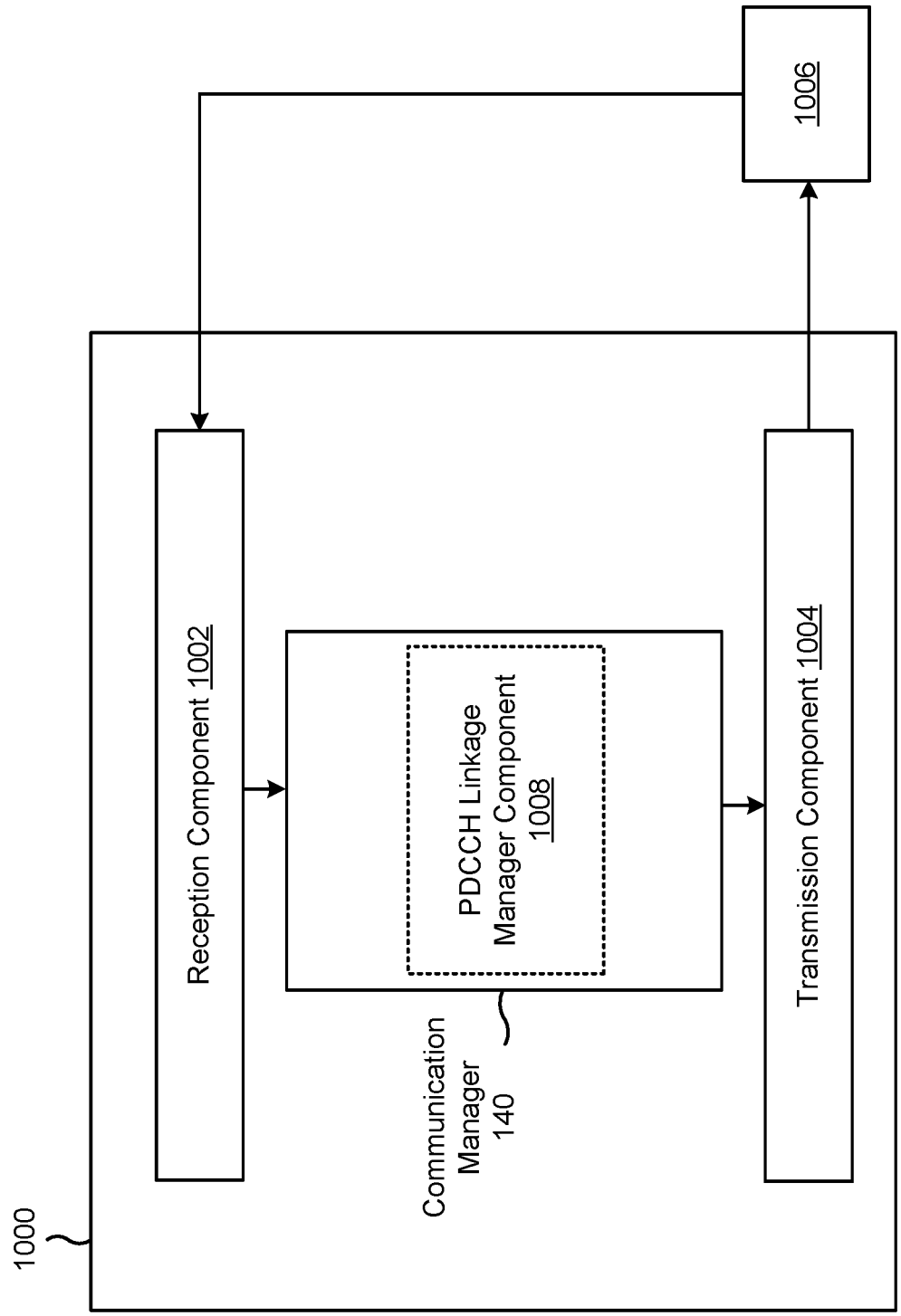
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a PDCCH linkage manager component 1008, among other examples. In some aspects, the apparatus 1000 may be configured to perform one or more operations described herein in connection with FIGS. 6 and 7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The PDCCH linkage manager component 1008 may receive, by way of the reception component 1002, a PDCCH linkage indication that is based at least in part on a slot configuration. The reception component 1002 may receive a first PDCCH in a first PDCCH occasion and a second PDCCH that is a repetition of the first PDCCH in a second PDCCH occasion, the second PDCCH occasion being an occurrence of one or more air interface resources configured with the slot configuration. The PDCCH linkage manager component 1008 may select a receive mode based at least in part on a slot configuration associated with the one or more air interfaces.

The PDCCH linkage manager component 1008 may perform blind decoding for a number of PDCCH occasions. Alternatively or additionally, the PDCCH linkage manager component 1008 may select a receive mode for receiving a PDCCH. To illustrate, the PDCCH linkage manager component 1008 may select, for a third PDCCH associated with a third PDCCH occasion, a receive mode for the third PDCCH based at least in part on a determination of whether the number of the PDCCH occasions satisfies a maximum threshold (e.g., associated with performing blind decoding).

The PDCCH linkage manager component 1008 may receive, by way of the reception component 1002, a configuration indication that specifies to use at least one of a first receive mode based at least in part on the number of the PDCCH occasions failing to satisfy the maximum threshold, or a second receive mode based at least in part on the number of the PDCCH occasions satisfying the maximum threshold.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
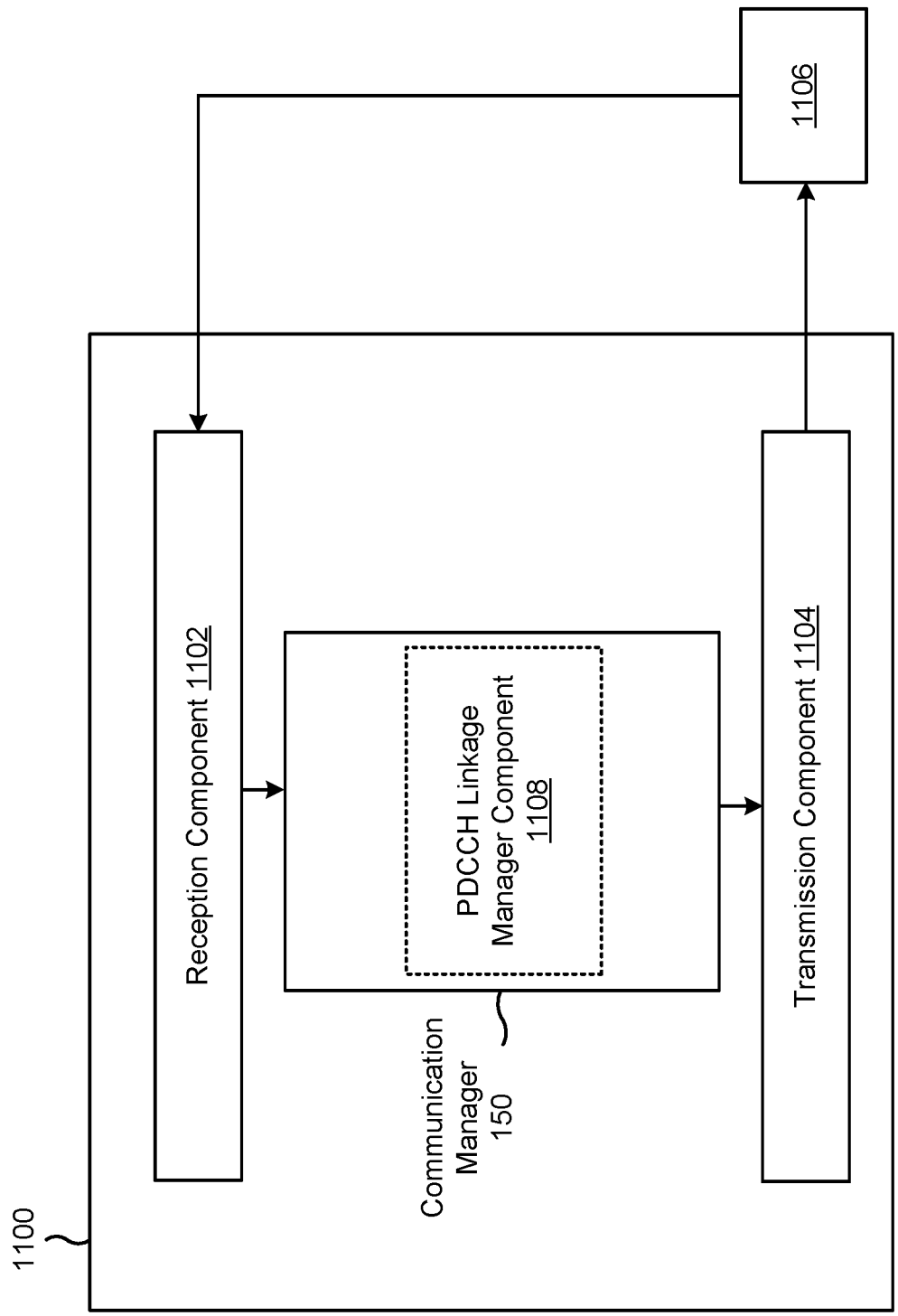
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a PDCCH linkage manager component 1108, among other examples.

In some aspects, the apparatus 1100 may be configured to perform one or more operations described herein in connection with FIGS. 6 and 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The PDCCH linkage manager component 1008 may transmit, by way of the transmission component 1104, a PDCCH linkage indication that is based at least in part on a slot configuration. The transmission component 1104 may transmit at least one of a first PDCCH in a first PDCCH occasion, or a second PDCCH that is a repetition of the first PDCCH in a second PDCCH occasion that includes an occurrence of one or more air interface resources configured with the slot configuration.

The PDCCH linkage manager component 1108 may transmit, by way of the transmission component 1104, a configuration indication that specifies to use at least one of a first receive mode based at least in part on a number of PDCCH occasions failing to satisfy a maximum threshold, or a second receive mode based at least in part on the number of the PDCCH occasions satisfying the maximum threshold.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by an apparatus of a user equipment (UE), comprising: receiving a physical downlink control channel (PDCCH) linkage indication that is based at least in part on a slot configuration; and receiving a first PDCCH in a first PDCCH occasion and a second PDCCH that is a repetition of the first PDCCH in a second PDCCH occasion, the second PDCCH occasion comprising an occurrence of one or more air interface resources configured with the slot configuration.

Aspect 2: The method of Aspect 1, wherein the slot configuration comprises at least one of: a slot type, a bandwidth size, or a sub-band size.

Aspect 3: The method of any of Aspects 1-2, wherein receiving the PDCCH linkage indication comprises: receiving a radio resource control (RRC) message that includes the PDCCH linkage indication. receiving a radio resource control (RRC) message that includes the PDCCH linkage indication.

Aspect 4: The method of Aspect 3, wherein the method further comprises: receiving, in the RRC message, an indication of the slot configuration. receiving, in the RRC message, an indication of the slot configuration.

Aspect 5: The method of any of Aspects 1-4, wherein the slot configuration indicates a first slot configuration, and the method further comprises: identifying a third PDCCH occasion that comprises an occurrence of one or more additional air interface resources configured with a second slot configuration that is different from the first slot configuration; and refraining from receiving a third PDCCH in the third PDCCH occasion based at least in part on the second slot configuration being different from the first slot configuration. identifying a third PDCCH occasion that comprises an occurrence of one or more additional air interface resources configured with a second slot configuration that is different from the first slot configuration; and refraining from receiving a third PDCCH in the third PDCCH occasion based at least in part on the second slot configuration being different from the first slot configuration.

Aspect 6: The method of any of Aspects 1-5, wherein the slot configuration indicates a first slot configuration, and the method further comprises: identifying a third PDCCH occasion that comprises an occurrence of one or more additional air interface resources configured with a second slot configuration that is different from the first slot configuration; and receiving, in the third PDCCH occasion and based at least in part on the second slot configuration being different from the first slot configuration, a third PDCCH using an independent PDCCH receive mode. identifying a third PDCCH occasion that comprises an occurrence of one or more additional air interface resources configured with a second slot configuration that is different from the first slot configuration; and receiving, in the third PDCCH occasion and based at least in part on the second slot configuration being different from the first slot configuration, a third PDCCH using an independent PDCCH receive mode.

Aspect 7: The method of any of Aspects 1-6, further comprising: performing blind decoding for a number of PDCCH occasions; and selecting, for a third PDCCH associated with a third PDCCH occasion, a receive mode for the third PDCCH based at least in part on a determination of whether the number of the PDCCH occasions satisfies a maximum threshold.

Aspect 8: The method of Aspect 7, wherein the number of the PDCCH occasions fails to satisfy the maximum threshold, wherein selecting the receive mode comprises selecting an independent PDCCH receive mode, and wherein the method further comprises: receiving, based at least in part on using the independent PDCCH receive mode, the third PDCCH as being independent of the first PDCCH and the second PDCCH. wherein selecting the receive mode comprises selecting an independent PDCCH receive mode, and wherein the method further comprises: receiving, based at least in part on using the independent PDCCH receive mode, the third PDCCH as being independent of the first PDCCH and the second PDCCH.

Aspect 9: The method of Aspect 7, wherein the number of the PDCCH occasions satisfies the maximum threshold, wherein selecting the receive mode comprises selecting a refrained receive mode, and wherein the method further comprises: refraining from receiving the third PDCCH based at least in part on using the refrained receive mode. wherein selecting the receive mode comprises selecting a refrained receive mode, and wherein the method further comprises: refraining from receiving the third PDCCH based at least in part on using the refrained receive mode.

Aspect 10: The method of Aspect 7, wherein the one or more air interface resources associated with the third PDCCH occasion are configured with the slot configuration, and wherein selecting the receive mode is based at least in part on the one or more air interface resources associated with the third PDCCH occasion being configured with the slot configuration. wherein selecting the receive mode is based at least in part on the one or more air interface resources associated with the third PDCCH occasion being configured with the slot configuration.

Aspect 11: The method of Aspect 7, further comprising: receiving a configuration indication that specifies to use at least one of: a first receive mode based at least in part on the number of the PDCCH occasions failing to satisfy the maximum threshold, or a second receive mode based at least in part on the number of the PDCCH occasions satisfying the maximum threshold.

Aspect 12: The method of Aspect 11, wherein the configuration indication specifies that: the first receive mode is an independent PDCCH receive mode and the second receive mode is a refrained receive mode, or the first receive mode is the refrained receive mode and the second receive mode is the independent PDCCH receive mode. the first receive mode is an independent PDCCH receive mode and the second receive mode is a refrained receive mode, or the first receive mode is the refrained receive mode and the second receive mode is the independent PDCCH receive mode.

Aspect 13: The method of Aspect 7, wherein selecting the receive mode is based at least in part on a communication standard that specifies to use at least one of: a first receive mode based at least in part on the number of the PDCCH occasions failing to satisfy the maximum threshold, or a second receive mode based at least in part on the number of the PDCCH occasions satisfying the maximum threshold. a first receive mode based at least in part on the number of the PDCCH occasions failing to satisfy the maximum threshold, or a second receive mode based at least in part on the number of the PDCCH occasions satisfying the maximum threshold.

Aspect 14: The method of Aspect 13, wherein the communication standard specifies that: the first receive mode is an independent PDCCH receive mode and the second receive mode is a refrained receive mode, or the first receive mode is the refrained receive mode and the second receive mode is the independent PDCCH receive mode. the first receive mode is an independent PDCCH receive mode and the second receive mode is a refrained receive mode, or the first receive mode is the refrained receive mode and the second receive mode is the independent PDCCH receive mode.

Aspect 15: A method of wireless communication performed by an apparatus of a network node, comprising: transmitting a physical downlink control channel (PDCCH) linkage indication that is based at least in part on a slot configuration; and transmitting at least one of: a first PDCCH in a first PDCCH occasion, or a second PDCCH that is a repetition of the first PDCCH in a second PDCCH occasion that comprises an occurrence of one or more air interface resources configured with the slot configuration.

Aspect 16: The method of Aspect 15, wherein the slot configuration comprises at least one of: a slot type, a bandwidth size, or a sub-band size.

Aspect 17: The method of Aspect 15 or Aspect 16, wherein transmitting at least one of the first PDCCH in the first PDCCH occasion or the second PDCCH in the second PDCCH occasion comprises: transmitting, by the network node, both of the first PDCCH in the first PDCCH occasion and the second PDCCH in the second PDCCH occasion. transmitting, by the network node, both of the first PDCCH in the first PDCCH occasion and the second PDCCH in the second PDCCH occasion.

Aspect 18: The method of any of Aspects 15-17, wherein transmitting at least one of the first PDCCH in the first PDCCH occasion or the second PDCCH in the second PDCCH occasion comprises: transmitting only one of the first PDCCH in the first PDCCH occasion or the second PDCCH in the second PDCCH occasion. transmitting only one of the first PDCCH in the first PDCCH occasion or the second PDCCH in the second PDCCH occasion.

Aspect 19: The method of any of Aspects 15-18, wherein transmitting the PDCCH linkage indication comprises: transmitting a radio resource control (RRC) message that includes the PDCCH linkage indication. transmitting a radio resource control (RRC) message that includes the PDCCH linkage indication.

Aspect 20: The method of Aspect 19, wherein transmitting the RRC message further comprises: transmitting, in the RRC message, an indication of the slot configuration. transmitting, in the RRC message, an indication of the slot configuration.

Aspect 21: The method of any of Aspects 15-20, further comprising: transmitting a configuration indication that specifies to use at least one of: a first receive mode based at least in part on a number of PDCCH occasions failing to satisfy a maximum threshold, or a second receive mode based at least in part on the number of the PDCCH occasions satisfying the maximum threshold.

Aspect 22: The method of Aspect 21, wherein the configuration indication specifies that: the first receive mode is an independent PDCCH receive mode and the second receive mode is a refrained receive mode, or the first receive mode is the refrained receive mode and the second receive mode is the independent PDCCH receive mode. the first receive mode is an independent PDCCH receive mode and the second receive mode is a refrained receive mode, or the first receive mode is the refrained receive mode and the second receive mode is the independent PDCCH receive mode.

Aspect 23: An apparatus for wireless communication at a device, comprising a processor; memory coupled with the processor; and instructions stored in the memory and executable by the processor to cause the apparatus to perform the method of one or more of Aspects 1-14.

Aspect 24: An apparatus for wireless communication at a device, comprising a processor; memory coupled with the processor; and instructions stored in the memory and executable by the processor to cause the apparatus to perform the method of one or more of Aspects 15-22.

Aspect 25: A device for wireless communication, comprising a memory and one or more processors coupled to the memory, the one or more processors configured to perform the method of one or more of Aspects 1-14.

Aspect 26: A device for wireless communication, comprising a memory and one or more processors coupled to the memory, the one or more processors configured to perform the method of one or more of Aspects 15-22.

Aspect 27: An apparatus for wireless communication, comprising at least one means for performing the method of one or more of Aspects 1-14.

Aspect 28: An apparatus for wireless communication, comprising at least one means for performing the method of one or more of Aspects 15-22.

Aspect 29: A non-transitory computer-readable medium storing code for wireless communication, the code comprising instructions executable by a processor to perform the method of one or more of Aspects 1-14.

Aspect 30: A non-transitory computer-readable medium storing code for wireless communication, the code comprising instructions executable by a processor to perform the method of one or more of Aspects 15-22.

Aspect 31: A non-transitory computer-readable medium storing a set of instructions for wireless communication, the set of instructions comprising one or more instructions that, when executed by one or more processors of a device, cause the device to perform the method of one or more of Aspects 1-14.

Aspect 32: A non-transitory computer-readable medium storing a set of instructions for wireless communication, the set of instructions comprising one or more instructions that, when executed by one or more processors of a device, cause the device to perform the method of one or more of Aspects 15-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, which are configured, individually or in any combination, to:
receive a physical downlink control channel (PDCCH) linkage indication that indicates a slot configuration as a condition for an occurrence of a linkage between a first PDCCH occasion and a second PDCCH occasion; and
receive, based at least in part on the occurrence of the linkage, a first PDCCH in the first PDCCH occasion and a second PDCCH that is a repetition of the first PDCCH in the second PDCCH occasion, the second PDCCH occasion comprising an occurrence of one or more air interface resources configured with the slot configuration.

2. The apparatus of claim 1, wherein the slot configuration that is a condition for the occurrence of the linkage comprises at least one of:
a slot type,
a bandwidth size, or
a sub-band size.

3. The apparatus of claim 1, wherein the one or more processors, to receive the PDCCH linkage indication, are configured to cause the apparatus to:
receive a radio resource control (RRC) message that includes the PDCCH linkage indication.

4. The apparatus of claim 1, wherein the slot configuration is a first slot configuration, and the one or more processors are further configured to cause the apparatus to:
identify a third PDCCH occasion that comprises an occurrence of one or more additional air interface resources configured with a second slot configuration that is different from the first slot configuration; and
refrain from receiving a third PDCCH in the third PDCCH occasion based at least in part on the second slot configuration being different from the first slot configuration.

5. The apparatus of claim 1, wherein the slot configuration is a first slot configuration, and the one or more processors are further configured to cause the apparatus to:
identify a third PDCCH occasion that comprises an occurrence of one or more additional air interface resources configured with a second slot configuration that is different from the first slot configuration; and
receive, in the third PDCCH occasion and based at least in part on the second slot configuration being different from the first slot configuration, a third PDCCH using an independent PDCCH receive mode.

6. The apparatus of claim 1, wherein the one or more processors are further configured to cause the apparatus to:
perform blind decoding for a number of PDCCH occasions; and
select, for a third PDCCH associated with a third PDCCH occasion, a receive mode for the third PDCCH based at least in part on a determination of whether the number of the PDCCH occasions satisfies a maximum threshold.

7. The apparatus of claim 6, wherein the number of the PDCCH occasions fails to satisfy the maximum threshold,
wherein the one or more processors, to select the receive mode, are configured to cause the apparatus to select an independent PDCCH receive mode, and
wherein the one or more processors are further configured to cause the apparatus to:
receive, based at least in part on using the independent PDCCH receive mode, the third PDCCH as being independent of the first PDCCH and the second PDCCH.

8. The apparatus of claim 6, wherein the number of the PDCCH occasions satisfies the maximum threshold,
wherein the one or more processors, to select the receive mode, are configured to cause the apparatus to select a refrained receive mode, and
wherein the one or more processors are further configured to cause the apparatus to:
refrain from receiving the third PDCCH based at least in part on using the refrained receive mode.

9. The apparatus of claim 6, wherein the one or more processors are further configured to cause the apparatus to:
receive a configuration indication that specifies to use at least one of:
a first receive mode based at least in part on the number of the PDCCH occasions failing to satisfy the maximum threshold, or
a second receive mode based at least in part on the number of the PDCCH occasions satisfying the maximum threshold.

10. The apparatus of claim 6, wherein selecting the receive mode is based at least in part on a communication standard that specifies to use at least one of:
a first receive mode based at least in part on the number of the PDCCH occasions failing to satisfy the maximum threshold, or
a second receive mode based at least in part on the number of the PDCCH occasions satisfying the maximum threshold.

11. The apparatus of claim 1, wherein the slot configuration comprises at least one of a full-duplex slot type or a half-duplex slot type.

12. An apparatus for wireless communication at a network node, comprising:
one or more memories; and
one or more processors, coupled to the one or more memories, which are configured, individually or in any combination, to:
transmit a physical downlink control channel (PDCCH) linkage indication that indicates a slot configuration as a condition for an occurrence of a linkage between a first PDCCH occasion and a second PDCCH occasion; and
transmit, based at least in part on the occurrence of the linkage, at least one of:
a first PDCCH in the first PDCCH occasion, or
a second PDCCH that is a repetition of the first PDCCH in the second PDCCH occasion that comprises an occurrence of one or more air interface resources configured with the slot configuration.

13. The apparatus of claim 12, wherein the slot configuration that is a condition for the occurrence of the linkage comprises at least one of:
a slot type,
a bandwidth size, or
a sub-band size.

14. The apparatus of claim 12, wherein the one or more processors, to transmit at least one of the first PDCCH in the first PDCCH occasion or the second PDCCH in the second PDCCH occasion, are configured to cause the apparatus to:
transmit both of the first PDCCH in the first PDCCH occasion and the second PDCCH in the second PDCCH occasion.

15. The apparatus of claim 12, wherein the one or more processors, to transmit at least one of the first PDCCH in the first PDCCH occasion or the second PDCCH in the second PDCCH occasion, are configured to cause the apparatus to:
transmit only one of the first PDCCH in the first PDCCH occasion or the second PDCCH in the second PDCCH occasion.

16. The apparatus of claim 12, wherein the one or more processors, to transmit the PDCCH linkage indication, are configured to cause the apparatus to:
transmit a radio resource control (RRC) message that includes the PDCCH linkage indication.

17. The apparatus of claim 16, wherein the one or more processors, to transmit the RRC message, are configured to cause the apparatus to:

transmit, in the RRC message, an indication of the slot configuration.

18. The apparatus of claim 17, wherein the one or more processors are further configured to cause the apparatus to:
transmit a configuration indication that specifies to use at least one of:
a first receive mode based at least in part on a number of PDCCH occasions failing to satisfy a maximum threshold, or
a second receive mode based at least in part on the number of the PDCCH occasions satisfying the maximum threshold.

19. The apparatus of claim 18, wherein the configuration indication specifies that:
the first receive mode is an independent PDCCH receive mode and the second receive mode is a refrained receive mode, or
the first receive mode is the refrained receive mode and the second receive mode is the independent PDCCH receive mode.

20. A method of wireless communication performed by an apparatus of a user equipment (UE), comprising:
receiving a physical downlink control channel (PDCCH) linkage indication that indicates a slot configuration as a condition for an occurrence of a linkage between a first PDCCH occasion and a second PDCCH occasion; and
receiving, based at least in part on the occurrence of the linkage, a first PDCCH in the first PDCCH occasion and the second PDCCH that is a repetition of the first PDCCH in a second PDCCH occasion, the second PDCCH occasion comprising an occurrence of one or more air interface resources configured with the slot configuration.

21. The method of claim 20, wherein receiving the PDCCH linkage indication comprises:
receiving a radio resource control (RRC) message that includes the PDCCH linkage indication.

22. The method of claim 21, wherein the method further comprises:
receiving, in the RRC message, an indication of the slot configuration.

23. The method of claim 20, wherein the slot configuration indicates a first slot configuration, and the method further comprises:
identifying a third PDCCH occasion that comprises an occurrence of one or more additional air interface resources configured with a second slot configuration that is different from the first slot configuration; and
refraining from receiving a third PDCCH in the third PDCCH occasion based at least in part on the second slot configuration being different from the first slot configuration.

24. The method of claim 20, wherein the slot configuration indicates a first slot configuration, and the method further comprises:
identifying a third PDCCH occasion that comprises an occurrence of one or more additional air interface resources configured with a second slot configuration that is different from the first slot configuration; and
receiving, in the third PDCCH occasion and based at least in part on the second slot configuration being different from the first slot configuration, a third PDCCH using an independent PDCCH receive mode.

25. The method of claim 20, further comprising:
performing blind decoding for a number of PDCCH occasions; and
selecting, for a third PDCCH associated with a third PDCCH occasion, a receive mode for the third PDCCH based at least in part on a determination of whether the number of the PDCCH occasions satisfies a maximum threshold.

26. The method of claim 25, further comprising:
receiving a configuration indication that specifies to use at least one of:
a first receive mode based at least in part on the number of the PDCCH occasions failing to satisfy the maximum threshold, or
a second receive mode based at least in part on the number of the PDCCH occasions satisfying the maximum threshold.

27. The method of claim 25, wherein selecting the receive mode is based at least in part on a communication standard that specifies to use at least one of:
a first receive mode based at least in part on the number of the PDCCH occasions failing to satisfy the maximum threshold, or
a second receive mode based at least in part on the number of the PDCCH occasions satisfying the maximum threshold.

28. A method of wireless communication performed by an apparatus of a network node, comprising:
transmitting a physical downlink control channel (PDCCH) linkage indication that indicates a slot configuration as a condition for an occurrence of a linkage between a first PDCCH occasion and a second PDCCH occasion; and
transmitting, based at least in part on the occurrence of the linkage, at least one of:
a first PDCCH in the first PDCCH occasion, or
a second PDCCH that is a repetition of the first PDCCH in the second PDCCH occasion that comprises an occurrence of one or more air interface resources configured with the slot configuration.

29. The method of claim 28, wherein the slot configuration that is a condition for the occurrence of the linkage comprises at least one of:
a slot type,
a bandwidth size, or
a sub-band size.

30. The method of claim 28, further comprising:
transmitting a configuration indication that specifies to use at least one of:
a first receive mode based at least in part on a number of PDCCH occasions failing to satisfy a maximum threshold, or
a second receive mode based at least in part on the number of the PDCCH occasions satisfying the maximum threshold.

* * * * *